US012666507B2

(12) United States Patent
Vopálka et al.

(10) Patent No.: US 12,666,507 B2
(45) Date of Patent: Jun. 23, 2026

(54) APPARATUS FOR AND A METHOD OF MICROWAVE HEATING OF ROTATABLE ARTICLES, ESPECIALLY GREEN TYRE BLANKS

(71) Applicant: ROMILL S.R.O., Brno (CZ)

(72) Inventors: Roman Vopálka, Tkalcovská (CZ); Nikolaj Ternovoj, Brno (CZ); Pavel Polcer, Brno (CZ)

(73) Assignee: ROMILL S.R.O., Brno (CZ)

( * ) Notice: Subject to any disclaimer, the term of this patent is extended or adjusted under 35 U.S.C. 154(b) by 974 days.

(21) Appl. No.: 17/801,890

(22) PCT Filed: Feb. 24, 2021

(86) PCT No.: PCT/CZ2021/050023
§ 371 (c)(1),
(2) Date: Aug. 24, 2022

(87) PCT Pub. No.: WO2021/170158
PCT Pub. Date: Sep. 2, 2021

(65) Prior Publication Data
US 2024/0015863 A1     Jan. 11, 2024

(30) Foreign Application Priority Data
Feb. 24, 2020     (CZ) .................................. PV2020-95

(51) Int. Cl.
H05B 6/76          (2006.01)
B29D 30/06          (2006.01)
(Continued)

(52) U.S. Cl.
CPC .......... H05B 6/80 (2013.01); B29D 30/0662 (2013.01); H05B 6/707 (2013.01); H05B 6/76 (2013.01);
(Continued)

(58) Field of Classification Search
CPC ..... B29C 35/0805; B29C 35/08; B29C 71/04; B29D 2030/0677; B29D 30/0005;
(Continued)

(56) References Cited

U.S. PATENT DOCUMENTS 3,745,291  A     7/1973  Peterson et al.
4,123,306  A    10/1978  Landry
(Continued)

FOREIGN PATENT DOCUMENTS

DE          4420198  A1    12/1995
EP          3418045  A1    12/2018
(Continued)

OTHER PUBLICATIONS

International Search Report for PCT/CZ2021/050023, dated May 31, 2021.

*Primary Examiner* — Quang T Van
(74) *Attorney, Agent, or Firm* — MaxGoLaw PLLC

(57) ABSTRACT

An apparatus for and a method of microwave heating of rotatable articles includes at least one microwave radiation source, at least one wave guide and a heating chamber for receiving a rotatable article which includes a material absorbing microwave radiation. Each microwave radiation source is connected to the heating chamber via at least one wave guide having at least one inlet in a lateral wall of the heating chamber. The heating chamber includes at least two covers in the form of an area defined by an inner and outer circumference. At least one cover is vertically slidable relative to the lateral wall of the heating chamber in combination with a stationary ring on the outer circumference of said area and at least one extendable portion on the inner circumference of said area. The method allows for direct and selective heating of the heated portion of the rotatable article.

20 Claims, 15 Drawing Sheets

(51) Int. Cl.

| | | |
|---|---|---|
| *H05B 6/70* | (2006.01) |
| *H05B 6/78* | (2006.01) |
| *H05B 6/80* | (2006.01) |
| *H05B 6/68* | (2006.01) |

(52) U.S. Cl.
   CPC ................. *H05B 6/78* (2013.01); *H05B 6/68* (2013.01); *H05B 2206/044* (2013.01)

(58) Field of Classification Search
   CPC .......... B29D 30/0662; H05B 2206/044; H05B 6/6411; H05B 6/68; H05B 6/707; H05B 6/76; H05B 6/78; H05B 6/80; H05B 6/64
   USPC ....... 219/690, 704, 706, 710, 748, 749, 754, 219/756, 762
   See application file for complete search history.

(56)                References Cited

U.S. PATENT DOCUMENTS

| 4,208,562 A | * | 6/1980 | Perreault | ................ | H05B 6/701 |
|---|---|---|---|---|---|
| | | | | | 219/749 |
| 4,456,806 A | * | 6/1984 | Arimatsu | ................. | H05B 6/80 |
| | | | | | 219/754 |
| 5,639,414 A | * | 6/1997 | Unseld | ................ | B29C 35/0288 |
| | | | | | 425/174.8 E |
| 2019/0111642 A1 | | 4/2019 | Chang et al. | | |

FOREIGN PATENT DOCUMENTS

| JP | H08335496 A | 12/1996 |
|---|---|---|
| JP | 2000061963 A | 2/2000 |
| JP | 2006062213 A | 3/2006 |

* cited by examiner 13
14
15
16

13
14
15
16

18
17
13

7
8
6
27
6
9

5

11

12

29

11

12

5

APPARATUS FOR AND A METHOD OF MICROWAVE HEATING OF ROTATABLE ARTICLES, ESPECIALLY GREEN TYRE BLANKS

FIELD OF THE INVENTION

The present invention relates to an apparatus for microwave heating of rotatable articles, in particular for preheating of green tyre blanks before a vulcanisation step and to a method of microwave heating of said rotatable articles.

BACKGROUND OF THE INVENTION

A part of a tyre manufacturing process is vulcanisation, where temperature and pressure are applied to a green tyre blank in a vulcanisation press in order to achieve the final shape and properties of the tyre. The heating time of the green tyre blank in the press, during which the required temperature is reached, is given by low thermal conductivity of the tyre material and is one of the limiting factors for the productivity of the press. To increase the productivity of the press, there is a desire to perform the heating of the tyre before an actual insertion into the vulcanisation press, which represents a possible application of microwave heating of rotatable articles.

Apparatuses for microwave heating of tyres are known in the prior art, as described, for example, in U.S. Pat. No. 3,867,606 A, which discloses an apparatus for heating tyres by microwave radiation with a moving source, a wave guide and a horn radiator which irradiates in particular the tyre tread. However, microwave radiation also heats other portions of the tyre, including the sidewalls, which, due to their size, shape or material, have a different degree and rate of heating, which can lead to undesired overheating during the heating. During the heating, the tyre rotates on a rotatable, flat and vertically adjustable table to achieve even irradiation around its entire circumference. The distance of the horn radiator from the tyre surface is given by a sensing and control means on the principle of a wheel, a spring-wrapped shaft, a ball bushing member, 2 actuators, 2 plungers with switches and a set of brackets connecting said means to the horn radiator.

The disadvantage of this apparatus is that the radiation source must be arranged movably relative to the heated article in order to be able to heat the various portions of the rotatable article, and therefore it is necessary to supply energy and a coolant with flexible cables and hoses. At the same time, the source and the heated article must be placed in one chamber to meet the requirements of safety and electromagnetic compatibility outside the apparatus, which creates a technical complexity of the solution and high space requirements.

U.S. Pat. No. 7,416,694 B2 discloses an apparatus for heating green tyre blanks, e. g., by FIR radiation, with a plurality of radiation sources that irradiate the tread and/or the sidewalls and/or the inner portion of the tyre. In addition, the apparatus may optionally include an induction heater with a coil inductively acting on the belts and the beads in the tyre. The tyre is supported from below by a lower supporting plate only in the area of the beads and pressed from above by an upper, rotatable, vertically adjustable supporting plate. At the same time, the inside of the tyre is kept under overpressure by means of a compressor, thereby preventing the structure of the green tyre blank from collapsing inwards during the heating. The tyre rotates on the lower and upper supporting plates during the heating. The source and the heated article must be placed in one chamber to meet the requirements of safety and electromagnetic compatibility outside the apparatus, which creates a technical complexity of the solution and high space requirements.

The disadvantage of this apparatus is the possibility of use exclusively for tyres with steel belts, wherein the heating rate is still limited by low thermal conductivity of the tyre material. In addition, when the material of the green tyre blank is heated, an undesirable creep phenomenon occurs, when the geometry of the green tyre blank changes due to forces acting at elevated temperatures, which may make it impossible to use this tyre in the subsequent manufacturing process.

Another U.S. Pat. No. 3,566,066 A discloses an apparatus for microwave heating of green tyre blanks prior to vulcanisation. The apparatus comprises at least one microwave radiation source, a wave guide, a rotation drive and a heating chamber configured to receive the green tyre blank. The heating chamber has a cylindrical floor plan with one square segment, into the lower wall of which chamber, an inlet of the wave guide of the microwave radiation source opens into the corner of said square segment. The heating chamber is provided with a top lid for inserting the tyre into the heating chamber from above and a rotatable, flat supporting disc for supporting the lower, non-heated portion of the green tyre blank. The supporting disc is mechanically connected to a shaft of a rotation drive, which further comprises a motor, an eccentric sheave, a connecting rod and a lever. The heated portion of the tyre is the tread as well as the sidewall of the tyre, uniform heating of portions of different thicknesses is ensured by the function of vanes at the inlet of the wave guide into the heating chamber.

The disadvantage of this apparatus is the inability to heat only specific portions of the tyre (e. g. only the tread). In addition, since only the lower sidewall is supported, the heating of the green tyre blank material causes an undesirable creep phenomenon in which the geometry of the green tyre blank changes due to forces acting at elevated temperatures, which may make it impossible to use this tyre in the subsequent manufacturing process.

In another known arrangement, as described, for example, in U.S. Pat. No. 3,898,411 A, an apparatus for microwave heating of green tyre blanks prior to vulcanisation is disclosed. This apparatus comprises at least one radiation source in the ultra-high frequency band (UHF; i. e. 300 MHz to 3 GHz), at least one wave guide, a rotation drive and a heating chamber configured to receive a green tyre blank. The rotation drive comprises an electric motor with a V-belt sheave, a V-belt and a shaft with a V-belt sheave. The heating chamber has a cylindrical floor plan, into the lateral wall of which chamber, at least one inlet of the wave guide of the UHF radiation source opens. The heating chamber comprises in its two hinged halves a plurality of horizontal covers in an annular shape and arranged one above another, which covers are mounted in the lateral walls of the heating chamber and which in the middle comprise an opening defined by the two hinged halves. These covers define a heating space between at least one wave guide inlet in the lateral wall of the heating chamber and the heated portion of the tyre, and thus allow selective heating of e. g. only the tread or only the sidewalls of the tyre by a separate UHF radiation source. The apparatus further comprises a rotatable, flat supporting disc with a ring groove for supporting the lower bead of the tyre, the support disc not being physically a part of the heating chamber, although it forms a bottom thereof in the middle. The apparatus also comprises a top plate with a circular groove and a clamping device for hanging the upper bead of the tyre, the top plate not being physically a part of the heating chamber, although it forms a cover thereof in the middle. The supporting disc and the top plate are rotatable on the shaft, or on an upper presser bar respectively, and are mechanically connected to the rotation drive by means of the shaft, a supporting shaft and a frictional connection of the supporting disc and the supporting shaft. There are further horizontal circular covers of a circular shape mounted to the supporting shaft, which covers are rotatable together with the supporting shaft and are therefore located in the middle of the tyre opening when heated.

The disadvantage of this apparatus is the mechanism of inserting the tyre into the heating chamber obliquely from below by sliding it onto the pivotably extended supporting shaft, wherein the two hinged halves of the heating chamber also have to be hinged away. In addition, the hinging of these halves away requires movable radiation sources, which either have to move together with the chamber or are connected to the chamber by technically demanding and functionally problematic flexible wave guides. Such a construction of the heating chamber with a separate bottom in the form of a supporting disc and a separate cover in the form of a top plate further requires a total of 3 technically demanding sealing joints to close the microwaves inside the heating chamber, namely a joint between the hinged halves of the chamber, a joint between the bottom, end walls of the chamber and the supporting disc, and a joint between the top, end walls of the chamber and the top plate. Another disadvantage of this apparatus is the impossibility of changing the arrangement of the horizontal covers according to the shape of a particular heated portion of the tyre (e. g. only a portion of the tread).

The general state of the art is further described in U.S. Pat. Nos. 4,157,464 A, 4,123,306 A and CN 203888099 U.

SUMMARY OF THE INVENTION

It is an object of the present invention to provide a method of and an apparatus for microwave heating of rotatable articles, thus providing direct and selective microwave heating of only a heated portion of a rotatable article of any shape, wherein non-heated portions of the rotatable article outside the heating space are not directly heated.

The above-cited object is achieved by an apparatus for microwave heating of rotatable articles according to independent claim 9, comprising at least one microwave radiation source, at least one wave guide and a heating chamber for receiving a rotatable article which comprises a material absorbing microwave radiation and implicitly comprises a rotation axis. Each microwave radiation source is connected to the heating chamber via at least one wave guide having at least one inlet in the lateral wall of the heating chamber. The heating chamber comprises at least two covers arranged one above another in the form of an area defined by an inner and outer circumference, any circumference of which may be a circle, polygon or ellipse, e. g. an area defined by the circumference of an inner circle and an outer circle (i. e. an annulus) or by the circumference of an inner circle and an outer polygon. This area should copy as closely as possible the shape of the rotatable article in a cross-section in the plane of the cover.

An essential feature of the apparatus is that at least one cover, such as both covers are mounted in the heating chamber and/or at least one cover, such as both covers are vertically slidable relative to the lateral walls of the heating chamber such that the covers prevent microwave radiation from propagating outside the heating space in the vertical direction, i. e. along the lateral walls of the heating chamber. An alternative of one cover mounted in the heating chamber and one cover vertically slidable relative to the lateral wall of the heating chamber is also possible. The mounting of the covers in the heating chamber can be in the lateral wall, in the base or in the ceiling. The covers further comprise an opening in the middle, which opening serves for the non-heated portions to extend beyond the heating space. These covers define a heating space between at least one inlet of the wave guide in the lateral wall of the heating chamber and the heated portion of the rotatable article. The heating chamber can be polygonal, cylindrical or irregular in shape. In an extreme case, the covers may form the base and the ceiling of the heating chamber itself.

An essential feature of the apparatus is that furthermore at least one cover, preferably both covers comprise a stationary ring on the outer circumference of said area and at least one extendable portion on the inner circumference of said area. The technical effect of said cover construction is to create a heating space for direct and selective microwave heating of only the heated portion of the rotatable article, wherein the non-heated portions of the rotatable article outside the heating space are not directly heated. The covers are therefore configured to prevent microwave radiation from propagating outside the heating space in the vertical direction. In addition, the solution where the cover has an extendable portion advantageously allows only these extendable portions to be opened when the rotatable article is inserted, which eliminates the need to open a substantial part of the chamber, including the microwave radiation sources.

The above-cited object is also achieved by an apparatus for microwave heating of rotatable articles according to independent claim 10, comprising at least one microwave radiation source, at least one wave guide and a heating chamber for receiving a rotatable article which comprises a material absorbing microwave radiation and implicitly comprises a rotation axis. Each microwave radiation source is connected to the heating chamber via at least one wave guide having at least one inlet in the lateral wall of the heating chamber. The heating chamber comprises at least two covers arranged one above another in the form of an area defined by an inner and outer circumference, any circumference of which may be a circle, polygon or ellipse, e. g. an area defined by the circumference of an inner circle and an outer circle (i. e. an annulus) or by the circumference of an inner circle and an outer polygon. This area should copy as closely as possible the shape of the rotatable article in a cross-section in the plane of the cover.

An essential feature of the apparatus is that at least one cover, such as both covers are vertically slidable relative to the lateral walls of the heating chamber such that the covers prevent microwave radiation from propagating outside the heating space in the vertical direction, i. e. along the lateral walls of the heating chamber. An alternative of one cover mounted in the heating chamber and one cover vertically slidable relative to the lateral wall of the heating chamber is also possible. The covers further comprise an opening in the middle which opening serves for the non-heated portions to extend beyond the heating space. These covers define a heating space between at least one inlet of the wave guide in the lateral wall of the heating chamber and the heated portion of the rotatable article. The heating chamber can be polygonal, cylindrical or irregular in shape. In an extreme case, the covers may form the base and the ceiling of the heating chamber itself. The technical effect of said cover construction is to create a heating space for direct and selective microwave heating of only the heated portion of the rotatable article, wherein the non-heated portions of the rotatable article outside the heating space are not directly heated. The covers are therefore configured to prevent microwave radiation from propagating outside the heating space in the vertical direction. In addition, the solution, where at least one cover is vertically slidable relative to the lateral wall of the heating chamber, makes it possible to adjust its height relative to the shape of the rotatable article.

In one embodiment, the extendable portion of the cover comprises extendable elements which are connected to the stationary ring by an extension mechanism.

In another embodiment, the extendable portion of the cover is in the form of an iris diaphragm and comprises a first rotatable ring that is rotatably attached to the stationary ring and at least two blades arranged in a circle and slidably mounted between the first rotatable ring and the stationary ring. The number of blades is not limited by any upper limit and the extendable portion of the cover can thus comprise two, three, four, five, six, seven, eight, nine, ten, eleven, twelve, thirteen, fourteen, fifteen, sixteen, seventeen, eighteen, nineteen, twenty or more blades.

In another embodiment, the extendable portion of the cover is in the form of an iris diaphragm and comprises a first rotatable ring rotatably attached to the stationary ring, a second rotatable ring rotatably attached to the stationary ring and the first rotatable ring, and blades arranged in a circle and slidably mounted between the first rotatable ring and the second rotatable ring. The use of two rotatable rings allows, in addition to the separate movement of the individual rings, for both rings to be moved at the same time, thus rotating the extendable portion, i. e. the blades. The blades thus rotate together with the rotatable article and the risk of damage to the heated article if it comes into contact with the cover is minimized.

In a preferred embodiment, the heating chamber comprises a supporting element for supporting the lower, non-heated portion of the article. The supporting element may preferably be in the shape of an inverted truncated cone, thus better copying the shape of selected rotatable articles, and/or is an integral part of the lower cover, which further simplifies the construction. The supporting element may be rotatable and mechanically connectable to a rotation drive or may be non-rotatable. The supporting element, or a part thereof, can also represent an external entity and be placed in the chamber only together with the heated article, i. e. the article is, for example, clamped in the supporting element outside the heating chamber and the whole is inserted inside.

In another embodiment, the heating chamber comprises a strutting element for strutting the upper, non-heated portion of the rotatable article. When the supporting element is rotatable, the strutting element is rotatable therewith such that the upper and lower non-heated portions of the rotatable article are rotatable relative to the heating chamber in the same direction and substantially at the same angular velocity, thereby preventing the lower non-heated portion from over-rotating relative to the upper. The use of the strutting element reduces the mechanical stress on the heated article and reduces the risk of damage.

In another preferred embodiment, the heating chamber comprises a suspension element for hanging the lower and upper non-heated portions of the rotatable article. In yet another preferred embodiment, the heating chamber comprises a suspension element for hanging the upper non-heated portion of the rotatable article and a supporting element for supporting the lower, non-heated portion of the article. The advantage of the suspension element resides in that it can also serve to insert/remove the rotatable article into/from the chamber. Especially when one apparatus is intended for heating a larger number of similar products, the suspension allows to simplify the construction of mechanisms and parts related to the change of the product.

The suspension element may be rotatable and mechanically connectable to the rotation drive or may be non-rotatable. When the supporting element is rotatable, the suspension member is rotatable therewith such that the upper and lower non-heated portions of the rotatable article are rotatable relative to the heating chamber in the same direction and substantially at the same angular velocity, thereby preventing the lower non-heated portion from over-rotating relative to the upper. The same applies to the rotatable suspension element for the upper as well as the lower non-heated portion.

In another embodiment, the wave guide is arranged around the entire circumference or at least a part of the circumference of the lateral wall of the heating chamber and comprises at least one inlet in the lateral wall of the heating chamber. There can be more than one inlet, e. g. in the form of slots of a circumferential slotted wave guide. The full-circumferential wave guide has the advantage that it does not require rotation of the rotatable article during heating and at the same time ensures homogeneous heating along its entire circumference. The architecture of the wave guide or wave guides can furthermore advantageously be divided by means of splitters.

In another embodiment, at least two wave guide inlets in the lateral wall of the heating chamber are arranged at a distance from each other and in the same and/or different horizontal plane. The use of more inlets allows, on one hand, a higher number of sources, and thus a higher power of the apparatus, as well as control of the power supplied by individual sources and, as a result, the control of the electromagnetic field and its adaptation to the shape and dimensions of the heated portion of the article.

An example of a heated rotatable article is a green tyre blank prior to vulcanisation, where it is possible to advantageously heat the tyre tread without at the same time supplying heat to the sidewalls, which are not critical for the processing rate in the vulcanisation press. In this embodiment, the supporting or suspension element is preferably adapted to support or suspend the tyre tread and/or the lower bead in the lower sidewall of the tyre, or to support or suspend the lower portion of another rotatable article, while the supporting or suspension element is adapted to support or suspend the upper bead or to support or suspend the upper portion of another rotatable article.

It is also an object of the present invention to provide a method of microwave heating of rotatable articles according to independent claim 1, which overcomes the above-cited drawbacks of the prior art, by means of at least one microwave radiation source in a heating chamber configured to receive a rotatable article comprising a material absorbing microwave radiation, wherein the rotatable article implicitly comprises a rotation axis. Each microwave radiation source is connected to the heating chamber via at least one wave guide with at least one inlet in the lateral wall of the heating chamber.

An essential feature of the method is to perform direct and selective heating of a heated portion of the rotatable article in a heating space defined by at least one wave guide inlet in the lateral wall of the heating chamber, the heated portion of the rotatable article and at least two covers arranged one above another and in the form of an area defined by an inner and outer circumference, any circumference of which may be a circle, polygon or ellipse, e. g. an area defined by the circumference of an inner circle and an outer circle (i. e. an annulus) or by the circumference of an inner circle and an outer polygon. At least one cover, such as both covers are mounted in the heating chamber and/or at least one cover, such as both covers are vertically slidable relative to the lateral walls of the heating chamber such that the covers prevent microwave radiation from propagating outside the heating space in the vertical direction, i. e. along the lateral walls of the heating chamber. The mounting of the covers in the heating chamber can be in the lateral wall, in the base or in the ceiling. At least one cover comprises a stationary ring on the outer circumference of said area and at least one extendable portion on the inner circumference of said area. Non-heated portions of the rotatable article outside the heating space are not directly heated, they can be heated by heat transfer within the structure of the rotatable article itself, or by natural convection of gas in the chamber, or by low intensity microwave radiation that passed through the wall of the heated article.

It is also an object of the present invention to provide a method of microwave heating of rotatable articles according to independent claim 2, which overcomes the above-cited drawbacks of the prior art, by means of at least one microwave radiation source in a heating chamber configured to receive a rotatable article comprising a material absorbing microwave radiation, wherein the rotatable article implicitly comprises a rotation axis. Each microwave radiation source is connected to the heating chamber via at least one wave guide with at least one inlet in the lateral wall of the heating chamber.

An essential feature of the method is to perform direct and selective heating of a heated portion of the rotatable article in a heating space defined by at least one wave guide inlet in the lateral wall of the heating chamber, the heated portion of the rotatable article and at least two covers arranged one above another and in the form of an area defined by an inner and outer circumference, any circumference of which may be a circle, polygon or ellipse, e. g. an area defined by the circumference of an inner circle and an outer circle (i. e. an annulus) or by the circumference of an inner circle and an outer polygon. At least one cover, such as both covers are vertically slidable relative to the lateral walls of the heating chamber such that the covers prevent microwave radiation from propagating outside the heating space in the vertical direction, i. e. along the lateral walls of the heating chamber. An alternative of one cover mounted in the heating chamber and one cover vertically slidable relative to the lateral wall of the heating chamber is also possible. Non-heated portions of the rotatable article outside the heating space are not directly heated due to the height adjustability of the covers, they can be heated by heat transfer within the structure of the rotatable article itself, or by natural convection of gas in the chamber, or by low intensity microwave radiation that passed through the wall of the heated article.

In a particularly preferred embodiment of the method, the rotatable article is a green tyre blank prior to vulcanisation, wherein the heated portion is the tread of the tyre, and the non-heated portions are the sidewalls of the tyre. Nonetheless, in another embodiment, the rotatable article may be a shaft or in general a cylinder of a material absorbing microwave radiation, e. g. a metal, rubber, ceramic or composite material.

When using rotatable articles in the form of green tyre blanks, the purpose of pre-heating is to ensure heating of the green tyre blank, wherein the main monitored parameters are the temperature reached, the heating time and the homogeneity of the heating. The target temperature should be reached in the shortest possible time and with the highest possible homogeneity of heating.

The supply of heat to the tyre is different in different portions of the tyre, due to the inhomogeneous electromagnetic field, different properties of rubber mixtures, in particular different dielectric properties due to e. g. admixtures, and different belt material, which has different properties to rubber mixtures. What is more, the steel belts can induce currents that accelerate heating, wherein from which belts green tyre blanks are made. The consequence of these factors is an uneven temperature distribution of the heated tyre. Above all, the maximum temperature is monitored, as it is necessary to prevent premature vulcanisation, and the minimum temperature is monitored as well, which has an impact on the time spent in the vulcanisation press.

Three phenomena are significant during heating. The first is the above-mentioned inhomogeneity of heat supply. The second phenomenon is a positive feedback between the temperature of the material and the absorption of microwave radiation. As the temperature increases, the properties of the rubber mixtures change such that microwave radiation is absorbed more intensively. The heating rate of already hot portions thus increases, and the homogeneity of the heating deteriorates. The third phenomenon is heat conduction within the tyre, where the increasing temperature difference between the portions of the tyre leads to more intense heat conduction, which causes the already heated portions to cool off, and promotes the cooler portions of the tyre to heat up. The heat conduction therefore contributes to improving the homogeneity of the heating, and since the amount of heat transferred by the conduction is time-dependent, the homogeneity of the heating can be improved by extending the heating time.

In another embodiment of the method, the heating of the heated portion of the rotatable article is performed by means of at least two microwave radiation sources, wherein the inlets of the wave guide of said microwave radiation sources are arranged at a distance from each other and in the same and/or different horizontal plane. By regulating the power of the microwave radiation sources, an inhomogeneous microwave radiation field can be created in the heating space. The inhomogeneous field is designed such as to compensate for the decrease in the homogeneity of tyre heating caused by the material and the positive feedback.

In another embodiment, the lower non-heated portion of the rotatable article in the heating chamber is supported by a supporting element during heating, and the upper non-heated portion of the rotatable article is strutted by a strutting element in the heating chamber. By supporting and strutting the heated article, its mechanical stress is reduced, which prevents damage to the heated article. The supporting and strutting element can be rotatable and mechanically connectable to a rotation drive, or non-rotatable.

In another embodiment, the lower non-heated portion of the rotatable article in the heating chamber is supported by a supporting element during heating, and the upper non-heated portion of the rotatable article is hung from a suspension member in the heating chamber. By supporting and hanging the heated article, its mechanical stress is reduced, which prevents damage to the heated article. The supporting and suspension element can be rotatable and mechanically connectable to a rotation drive, or non-rotatable. The supporting element, or a part thereof, can also be placed in the chamber together with the heated article, i. e. the article is, for example, clamped in the supporting element outside the heating chamber and the whole is inserted inside.

Alternatively, the lower and upper non-heated portion of the rotatable article in the heating chamber are hung from a suspension element during heating, thereby reducing its mechanical stress, which prevents damage to the heated article. The suspension element can be rotatable and mechanically connectable to a rotation drive, or non-rotatable.

When using rotatable elements, the rotatable article is rotated relative to the heating chamber during heating such that the upper and lower non-heated portions of the rotatable article are rotatable in the same direction and substantially at the same angular speed. It is in particular the combination of a rotatable supporting element and a rotatable strutting element, or the combination of a rotatable supporting element and a rotatable suspension element, or a rotatable suspension element.

BRIEF SUMMARY OF THE DRAWINGS

The underlying inventive idea of the invention will be further elucidated on the basis of examples of its embodiments, which are described with the aid of the accompanying drawings, where.

EXEMPLARY EMBODIMENTS OF THE INVENTION

The invention will be further elucidated on the basis of exemplary embodiments with reference to the accompanying drawings.

Figure 1:
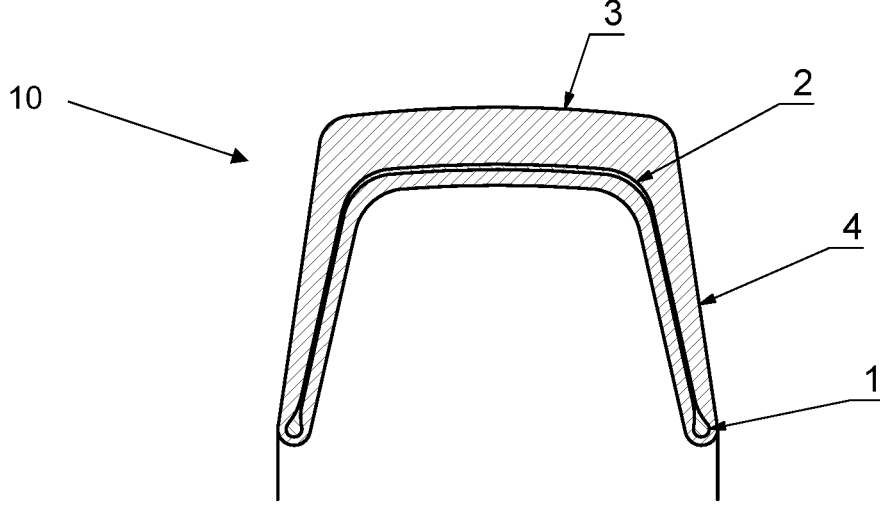
FIG. 1 shows a cross-sectional view of a rotatable article, in particular a green tyre blank.

FIG. 1 shows a cross-sectional view of an example of a rotatable article 10, in particular a half of a green tyre blank, which comprises a pair of beads 1, a belt 2 (e. g. steel or textile), a lower and upper sidewall 4 and a tread 3, wherein the heated portion 3 is the tread and the non-heated portions are the sidewalls 4 of the tyre. Apparatuses for microwave heating of rotatable articles 10 are shown below by way of example of a green tyre blank, but the skilled person will appreciate that with the same effect, the rotatable article can be any article comprising a material absorbing microwave radiation, e. g. metal or ceramic, and implicitly comprising a rotation axis, e. g. a shaft or a general cylinder.

The skilled person will also appreciate the fact that the entire apparatus, which is described in the examples below based on a vertical axis of rotation of the rotatable article can be rotated sideways, thereby changing the vertical axis of rotation to a horizontal axis of rotation and the remaining parts of the apparatus and steps of the method remain analogous. Terms such as "upper", "lower", "vertical", "lateral", etc. refer to the vertical axis of rotation of the rotatable article 10.

Figure 2:
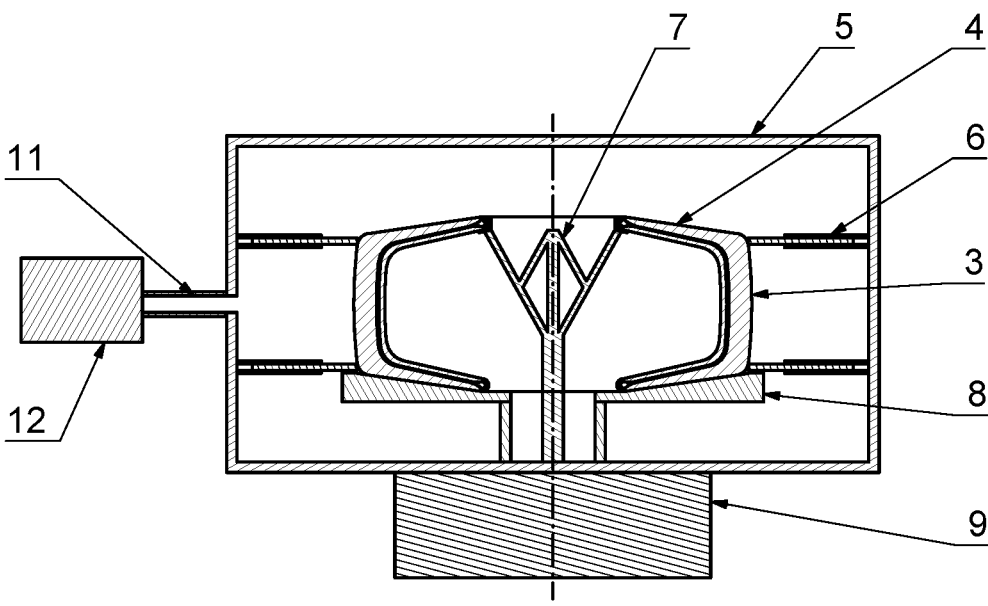
FIG. 2 shows a schematic cross-sectional view of an apparatus for microwave heating of rotatable articles in an embodiment with one microwave radiation source, a supporting and a strutting element and a rotation drive.

Example 1: An Apparatus for Microwave Heating of Rotatable Articles with One Microwave Radiation Source, a Supporting and a Strutting Element, a Rotation Drive and a Pair of Covers FIG. 2 shows a schematic cross-sectional view of the apparatus for microwave heating of rotatable articles 10 in a first embodiment. The apparatus comprises one microwave radiation source 12, one wave guide 11, a rotation drive 9 and a heating chamber 5 for receiving a rotatable article 10. The microwave radiation source 12 is connected to the heating chamber 5 via the wave guide 11 with an inlet in the lateral wall of the heating chamber 5. The heating chamber 5 comprises two covers 6 arranged one above the other and in the form of an area defined by an inner and outer circumference, any circumference of which may be a circle, polygon or ellipse, e. g. an area defined by the circumference of an inner circle and an outer circle (i. e. an annulus) or by the circumference of an inner circle and an outer polygon. The covers 6 are mounted in the lateral walls (or alternatively in the base or in the ceiling) of the heating chamber 5 and comprise an opening in the middle. The covers 6 define a heating space between the inlet of the wave guide 11 in the lateral wall of the heating chamber 5 and the heated portion 3 (e. g. a tread) of the rotatable article 10 (e. g. a green tyre blank prior to vulcanisation), thus preventing microwave radiation from propagating outside the heating space in the vertical direction. The heating chamber 5 further comprises on one hand a supporting element 8 for supporting the lower, non-heated portion 4 (e. g. a lower sidewall) of the rotatable article 10, the supporting element 8 being rotatable and mechanically connectable to the rotation drive 9, and on the other hand a strutting element 7 for strutting the upper, non-heated portion 4 (e. g. an upper sidewall) of the rotatable article 10, the strutting element 7 being rotatable together with the supporting element 8 such that the upper and lower non-heated portion 4 of the rotatable article 10 can rotate during the heating in the same direction and substantially at the same angular speed, whereby compensation of the non-uniformity of the field around the circumference is achieved and homogeneous heating of the rotatable article 10 is ensured. The supporting element 8 can be in the shape of an inverted truncated cone (e. g. a bowl). Thus, the supporting element 8 can be adapted to support the tread 3 of the tyre and/or the lower bead 1 in the lower sidewall 4 of the tyre or to support the lower part of another rotatable article, while the strutting element 7 is adapted to support the upper bead 1 or to support the upper part of another rotatable article.

Figure 3:
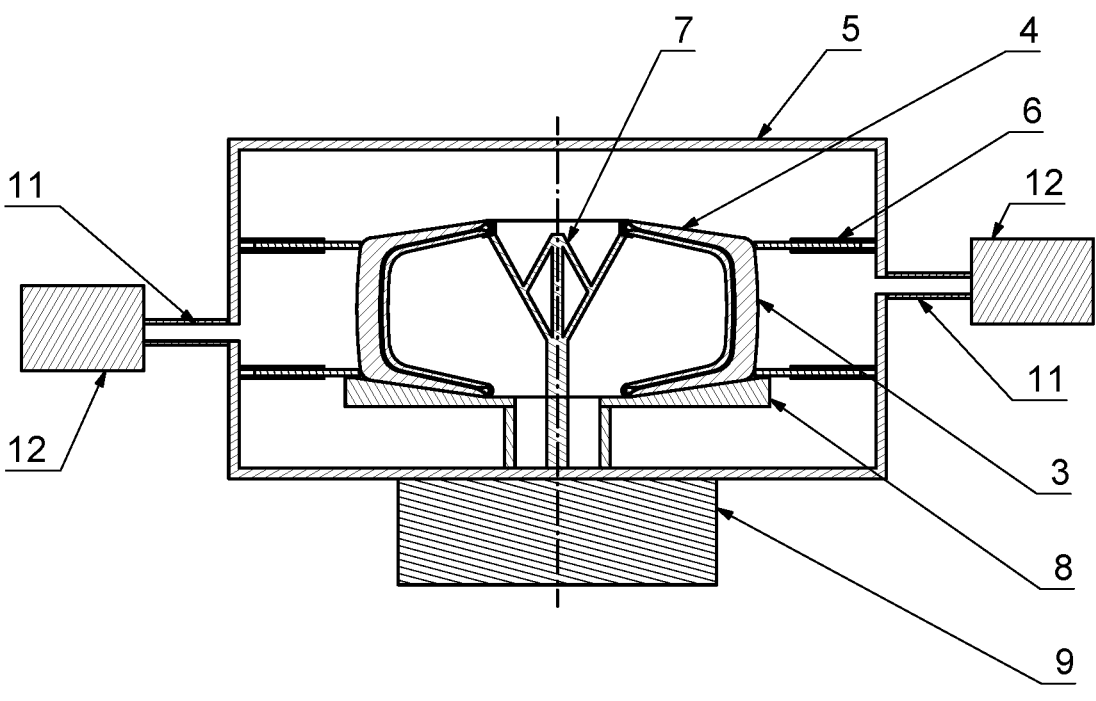
FIG. 3 shows a schematic cross-sectional view of an apparatus for microwave heating of rotatable articles in an embodiment with a plurality of microwave radiation sources, a supporting and a strutting element.

Example 2: An Apparatus for Microwave Heating of Rotatable Articles with a Plurality of Microwave Radiation Sources, a Supporting and a Strutting Element, a Rotation Drive and a Pair of Covers FIG. 3 shows a schematic cross-sectional view of the apparatus for microwave heating of rotatable articles 10 in a second embodiment. The apparatus comprises two microwave radiation sources 12, two wave guides 11, a rotation drive 9 and a heating chamber 5 for receiving a rotatable article 10. The microwave radiation sources 12 are connected to the heating chamber 5 via the wave guides 11 having inlets in the lateral wall of the heating chamber 5. These two inlets the wave guides 11 are arranged at a distance from each other in the lateral wall of the heating chamber 5 and in a different horizontal plane, which makes it possible to create an inhomogeneous microwave radiation field by regulating the power of the individual sources 12. The covers 6, the supporting element 8 and the strutting element 7 are analogous to those described in FIG. 2.

Figure 4:
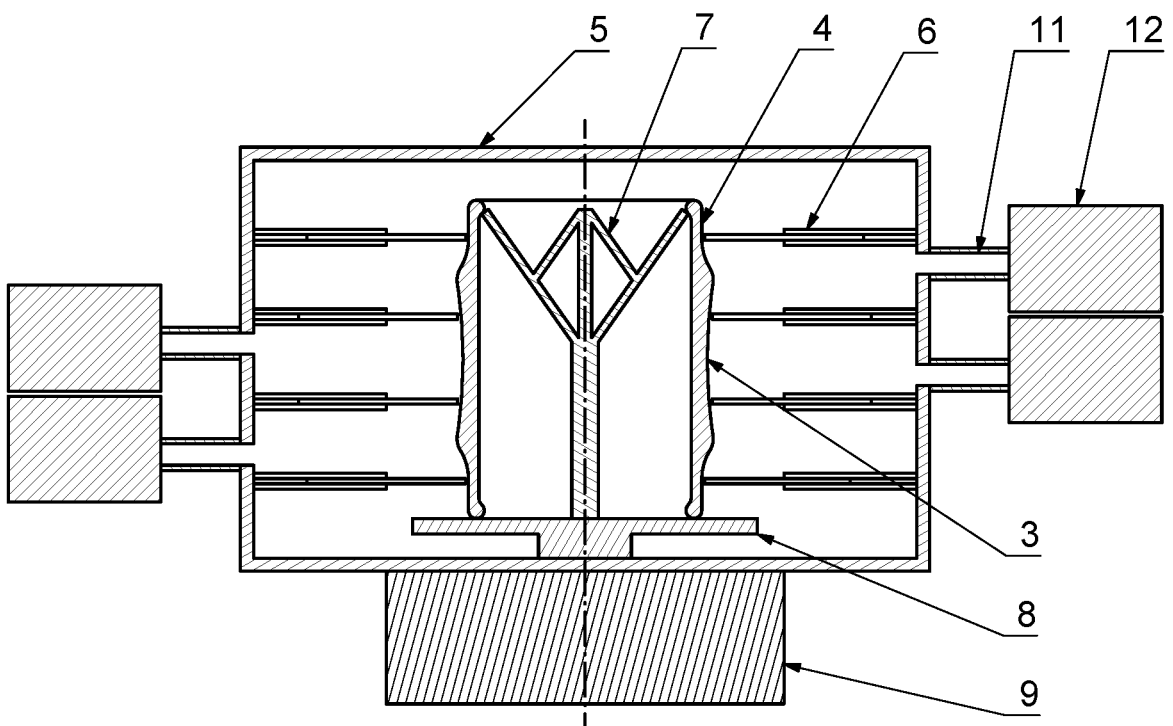
FIG. 4 shows a schematic cross-sectional view of an apparatus for microwave heating of rotatable articles in an embodiment with a plurality of microwave radiation sources, a plurality of covers, a supporting and a strutting element.

Example 3: An Apparatus for Microwave Heating of Rotatable Articles with a Plurality of Microwave Radiation Sources, a Supporting and a Strutting Element, a Rotation Drive and Four Covers FIG. 4 shows a schematic cross-sectional view of the apparatus for microwave heating of rotatable articles 10 in a third embodiment. The apparatus comprises four microwave radiation sources 12, four wave guides 11, a rotation drive 9 and a heating chamber 5 for receiving a rotatable article 10. The microwave radiation sources 12 are connected to the heating chamber 5 via the wave guides 11 having inlets in the lateral wall of the heating chamber 5. These four inlets of the wave guides 11 are arranged in the lateral wall of the heating chamber 5 at a distance from each other and in different horizontal planes, which allows the formation of an inhomogeneous microwave radiation field by regulating the power of the individual sources 12. In addition, the heating chamber 5 comprises four covers 6 arranged one above another and in the form of an area defined by an inner and outer circumference, e. g. the circumference of an inner circle and an outer circle or by the circumference of an inner circle and an outer polygon. The covers 6 are mounted in the lateral walls (or alternatively in the base or in the ceiling) of the heating chamber 5 and comprise an opening in the middle. A pair of adjacent covers 6 defines a heating space between at least one inlet of the wave guide 11 in the lateral wall of the heating chamber 5 and the heated portion 3 (e. g. a tread divided into several zones) of the rotatable article 10 (e. g. a green tyre blank prior to vulcanisation). Thus, there are more heating spaces, which makes it possible to divide the heated portion into several zones and to perform microwave zone heating. Several inlets of individual wave guides 11 can open into one heating space, which again allows the formation of an inhomogeneous field of microwave radiation. The supporting element 8 and the strutting element 7 are analogous to those described in FIG. 2.

Figure 21:
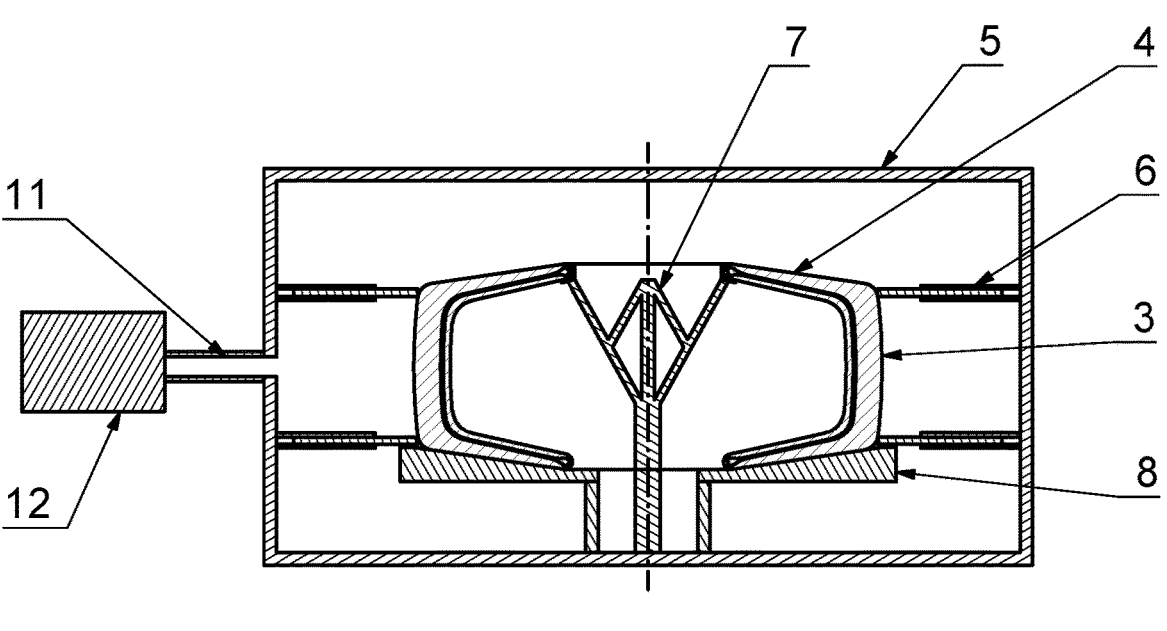
FIG. 21 shows a schematic cross-sectional view of an apparatus for microwave heating of rotatable articles in an embodiment with one microwave radiation source, a supporting and a strutting element and without a rotation drive.
Figure 24:
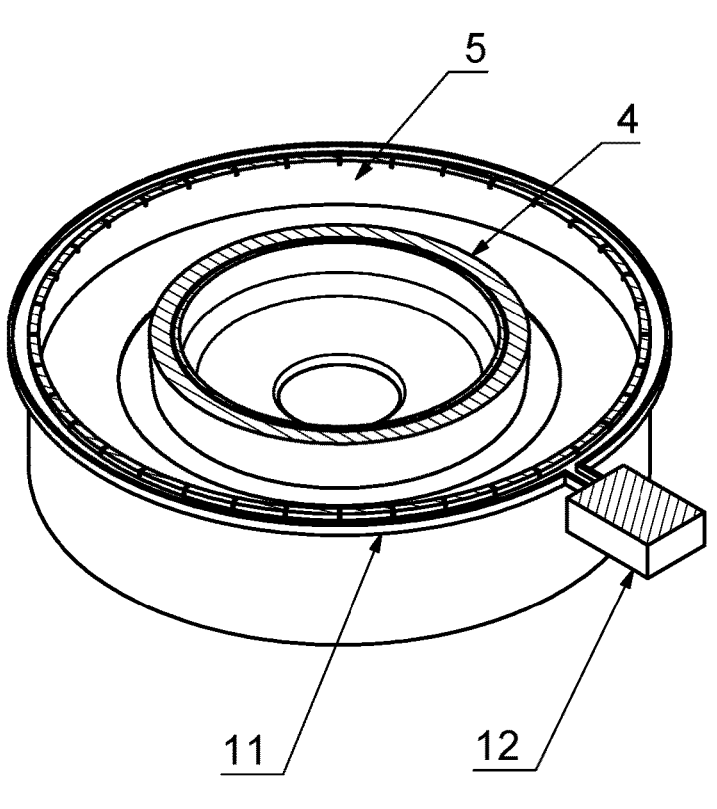
FIG. 24 shows a perspective view of a heating chamber with a wave guide arranged around its entire circumference.
Figure 25:
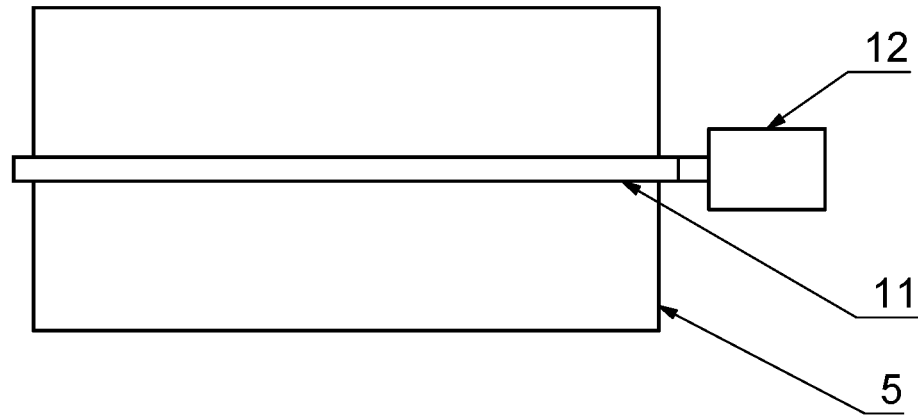
FIG. 25 shows a schematic cross-sectional view of a heating chamber with a wave guide arranged around its entire circumference.
Figure 26:
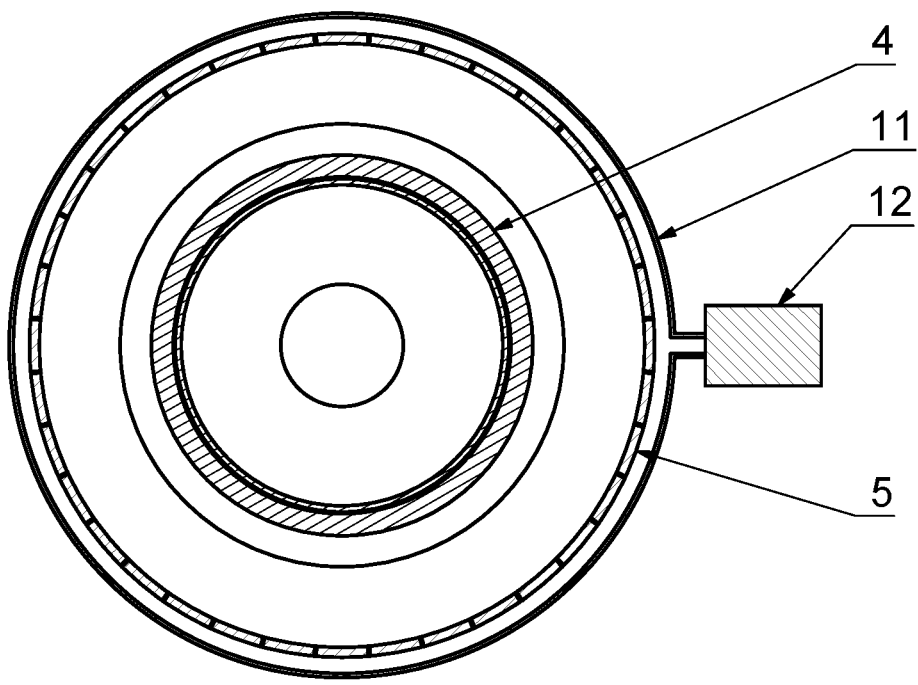
FIG. 26 shows a top sectional view of a heating chamber with a wave guide arranged around its entire circumference.
Figure 27:
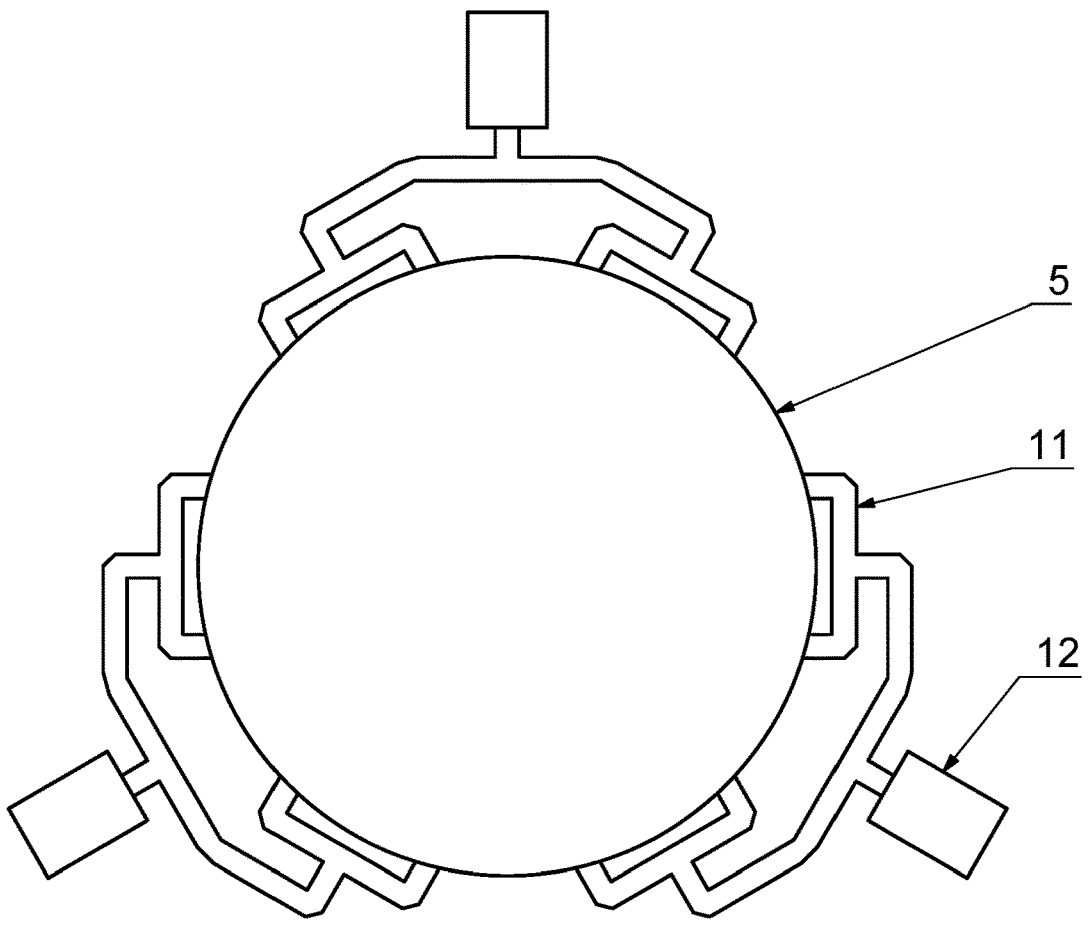
FIG. 27 shows a schematic cross-sectional view of a heating chamber with a wave guide architecture determined by splitters.

Example 4: An Apparatus for Microwave Heating of Rotatable Articles with One Microwave Radiation Source, a Supporting and a Strutting Element, without a Rotation Drive and with a Pair of Covers FIG. 21 shows a schematic cross-sectional view of the apparatus for microwave heating of rotatable articles 10 in a fourth embodiment, which is identical to the first embodiment in Example 1 except the following. The apparatus does not include a rotation drive, i. e. the supporting element 8 for supporting the lower, non-heated portion 4 (e. g. a lower sidewall) of the rotatable article 10, and the strutting element 7 for strutting the upper, non-heated portion 4 (e. g. an upper sidewall) of the rotatable article 10 are non-rotatable and the rotatable article 10 remains static during the heating. The microwave radiation source 12 is connected to the heating chamber 5 via a wave guide 11 arranged around the entire circumference of the lateral wall of the heating chamber 5 with at least one inlet, preferably a plurality of inlets in the lateral wall of the heating chamber 5. This is a so-called slotted wave guide according to FIGS. 24, 25 and 26, which is known in the art and typically used e. g. in slotted antennas. The covers 6 (according to Example 1) thus define a heating space between the inlets of the wave guide 11 in the lateral wall of the heating chamber 5 around its entire circumference and the heated portion 3 (e. g. a tread) of the rotatable article 10 (e. g. a green tyre blank prior to vulcanisation), whereby uniform heating of the rotatable article around its entire circumference without the need to rotate it is achieved and the propagation of microwave radiation outside the heating space in the vertical direction is prevented. The wave guide 11 does not necessarily have to be arranged around the entire circumference of the heating chamber, as the arrangement of several wave guides 11 along parts of the circumference of the heating chamber 5 works with an equal effect, wherein each wave guide 11 may have its own microwave radiation source 12, or splitters according to FIG. 27 for dividing microwave radiation from a single source 12 into a plurality of wave guides 11 can be used. The wave guide described above can be combined with all other embodiments of the present invention.

Figure 22:
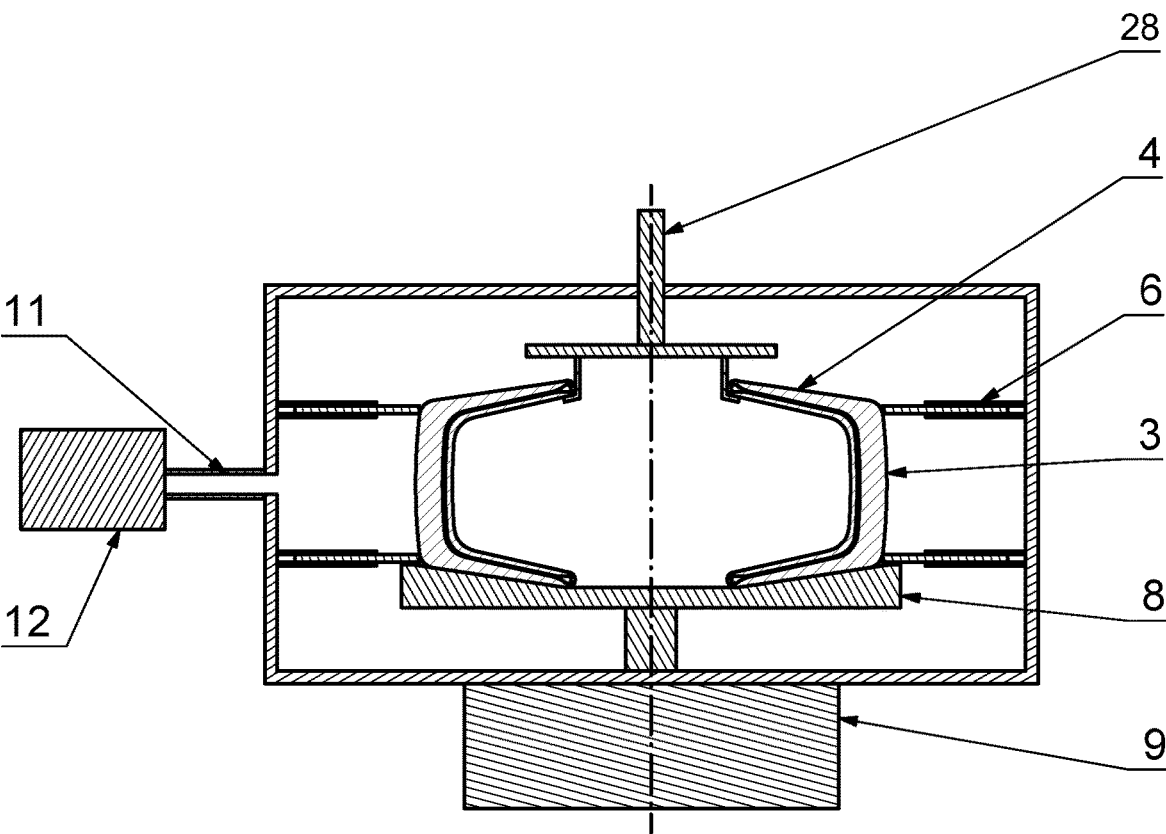
FIG. 22 shows a schematic cross-sectional view of an apparatus for microwave heating of rotatable articles in an embodiment with one microwave radiation source, a supporting and a suspension element and a rotation drive.

Example 5: An Apparatus for Microwave Heating of Rotatable Articles with One Microwave Radiation Source, a Supporting and a Suspension Element, a Rotation Drive and a Pair of Covers FIG. 22 shows a schematic cross-sectional view of the apparatus for microwave heating of rotatable articles 10 in a fifth embodiment, which is identical to the first embodiment in Example 1 except the following. The heating chamber 5 comprises on one hand a supporting element 8 for supporting the lower, non-heated portion 4 (e. g. a lower sidewall) of the rotatable article 10, the supporting element 8 being rotatable and mechanically connectable to the rotation drive 9, and on the other hand, instead of a strutting element, it comprises a suspension element 28 for hanging the upper, non-heated portion 4 (e. g. an upper sidewall) of the rotatable article 10, the suspension element 28 being rotatable together with the supporting element 8 and mechanically connectable to the rotation drive 9 such that the upper and lower non-heated portions 4 of the rotatable article 10 can be rotated during heating in the same direction and substantially at the same angular velocity. The suspension element 28 may be, for example, a commonly used annular stacker or a suspension hook assembly for suspending the bead of a green tyre blank.

Figure 23:
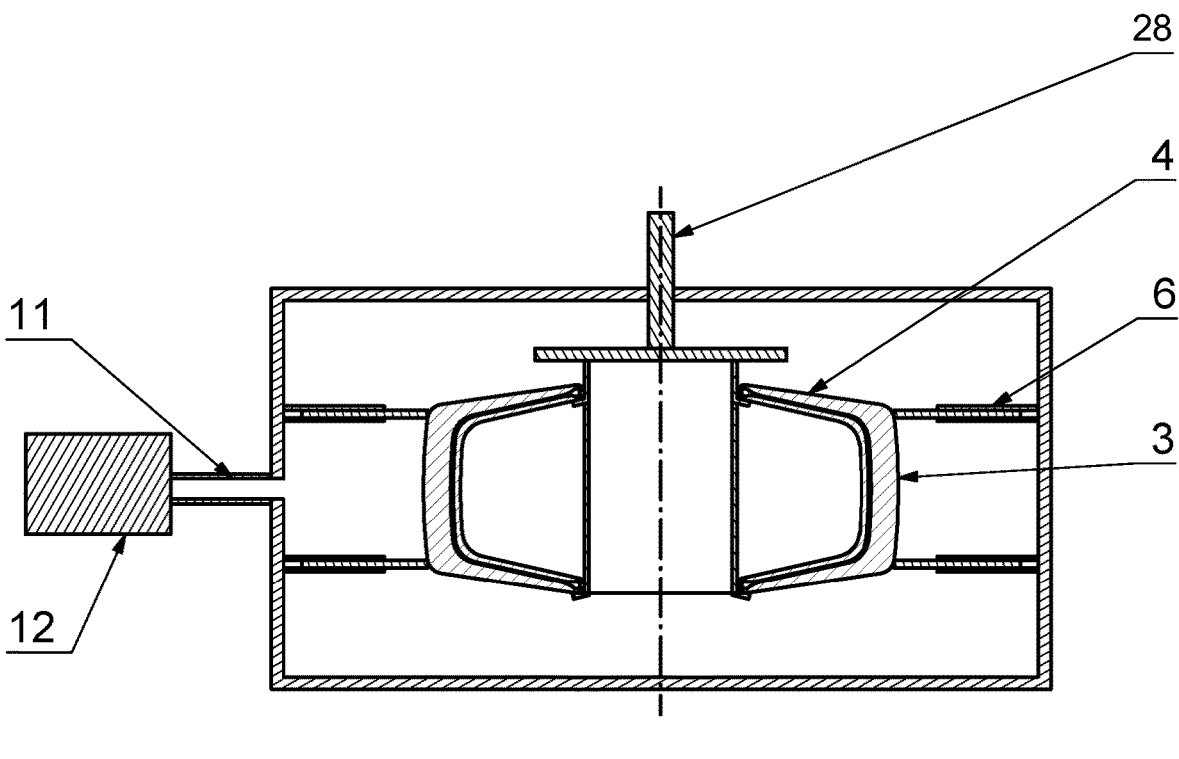
FIG. 23 shows a schematic cross-sectional view of an apparatus for microwave heating of rotatable articles in an embodiment with one microwave radiation source and a suspension element and without a rotation drive.

Example 6: An Apparatus for Microwave Heating of Rotatable Articles with One Microwave Radiation Source, a Suspension Element, without a Rotation Drive and with a Pair of Covers FIG. 23 shows a schematic cross-sectional view of an apparatus for microwave heating of rotatable articles 10 in a sixth embodiment, which is identical to the fourth embodiment in Example 4 except the following. Instead of a supporting and a strutting element, the heating chamber 5 comprises a suspension element 28 for supporting the lower, non-heated portion 4 (e. g. a lower sidewall) and for hanging the upper, non-heated portion 4 (e. g. an upper sidewall) of the rotatable article 10, wherein the suspension element 28 is non-rotatable and the rotatable article 10 remains static during the heating. The suspension element 28 may be, for example, a commonly used annular stacker or a suspension hook assembly for suspending the beads of a green tyre blank. At least one microwave radiation source 12 and at least one wave guide 11 can then be arranged according to Example 4.

Figure 5:
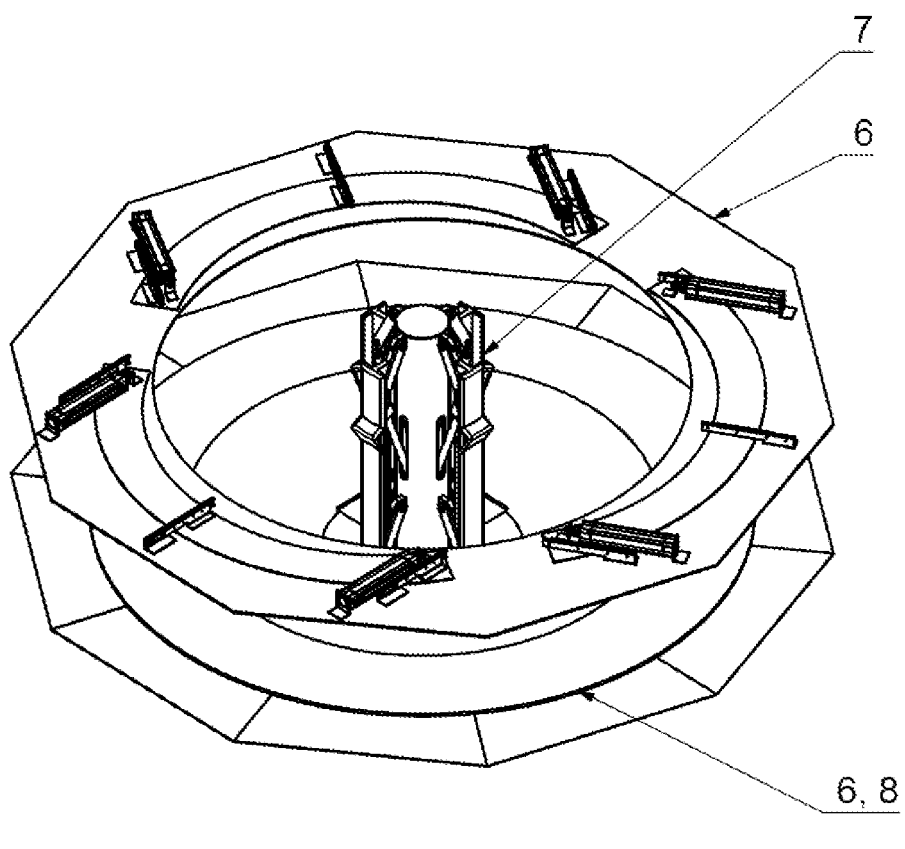
FIG. 5 shows a perspective view of the cover and the supporting element as an integral part of the lower cover.

Example 7: First Embodiment of a Cover with Linearly and Radially Extendable Elements FIG. 5 shows a first embodiment of the covers 6, i. e. the lower and upper cover 6. The supporting element 8 is in this case an integral part of the lower cover 6 and may be in the shape of an inverted truncated cone (e. g. a bowl). The strutting element 7 is analogous to that described in FIG. 2.

Figure 6:
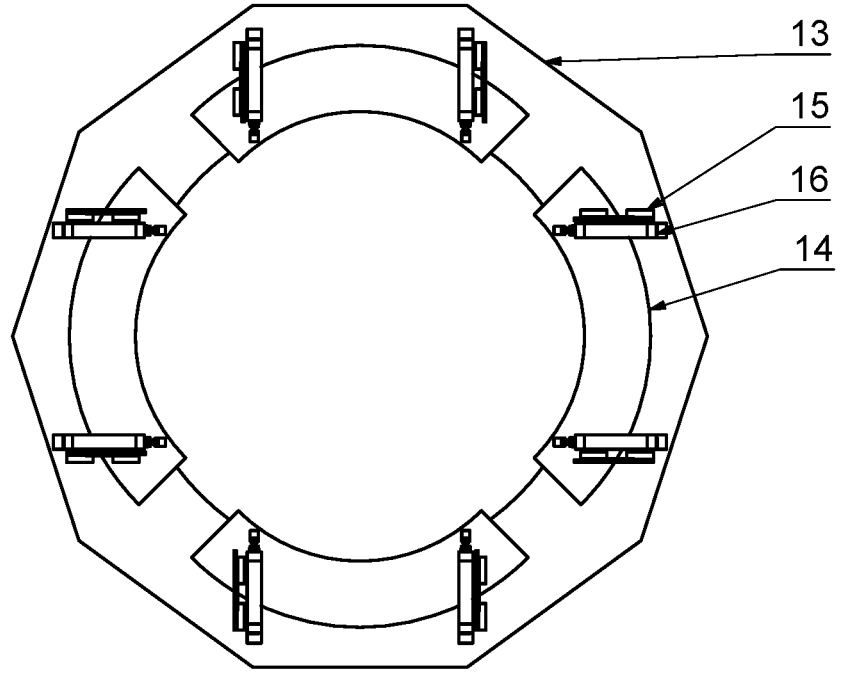
FIG. 6 shows a top view of a cover with an extendable portion comprising linearly extendable elements and an extension mechanism in a retracted position.
Figure 7:
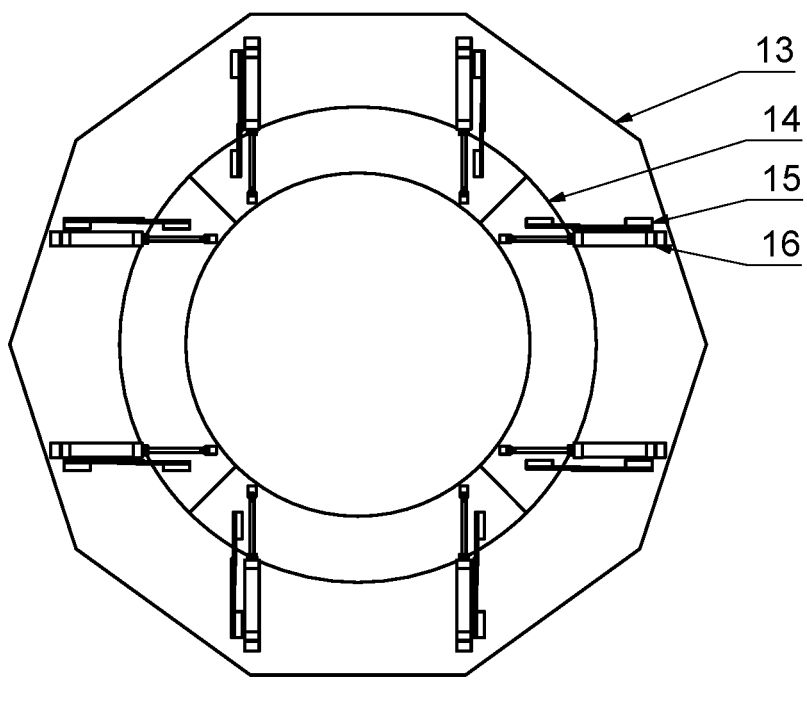
FIG. 7 shows a top view of a cover with an extendable portion comprising linearly extendable elements and an extension mechanism in an extended position.
Figure 8:
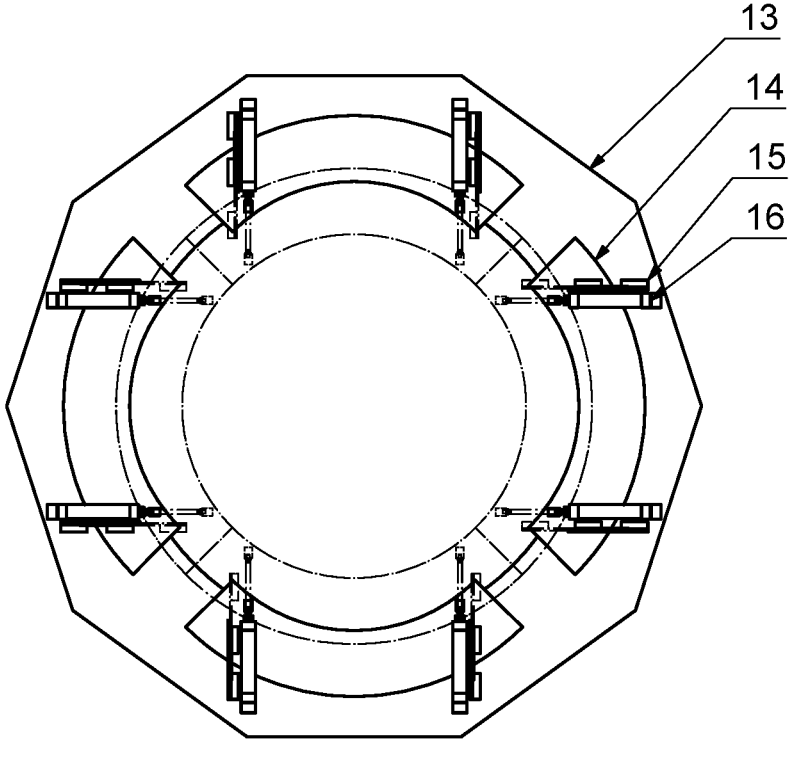
FIG. 8 shows a top view of a cover with an extendable portion comprising linearly extendable elements and an extension mechanism in a retracted (solid line) and an extended (dotted line) position.

FIGS. 6, 7 and 8 show a detail of a first embodiment of the cover 6 with the stationary ring 13 on the outer circumference of said area, which is mounted in the lateral walls (or alternatively in the base or in the ceiling) of the heating chamber 5, and with the extendable portion 14 on the inner circumference of said area, which extendable portion 14 is formed by four linearly and radially extendable elements 15 which are connected to the stationary ring 13 by an extension mechanism 16. The extension mechanism 16 may operate on a pneumatic, hydraulic, magnetic or electrical principle or other displacement principle and may comprise e. g. a linear guide and a cylinder having a piston and a rod. FIG. 6 shows the extendable elements 15 in a retracted position, FIG. 7 in an extended position and FIG. 8 in the retracted (solid line) and extended position (dashed line). The extendable elements 15 are in the retracted position, in particular when inserting and removing the rotatable article 10 into/from the heating chamber 5, and in the extended position, in particular during the microwave heating of the rotatable article 10.

Figure 9:
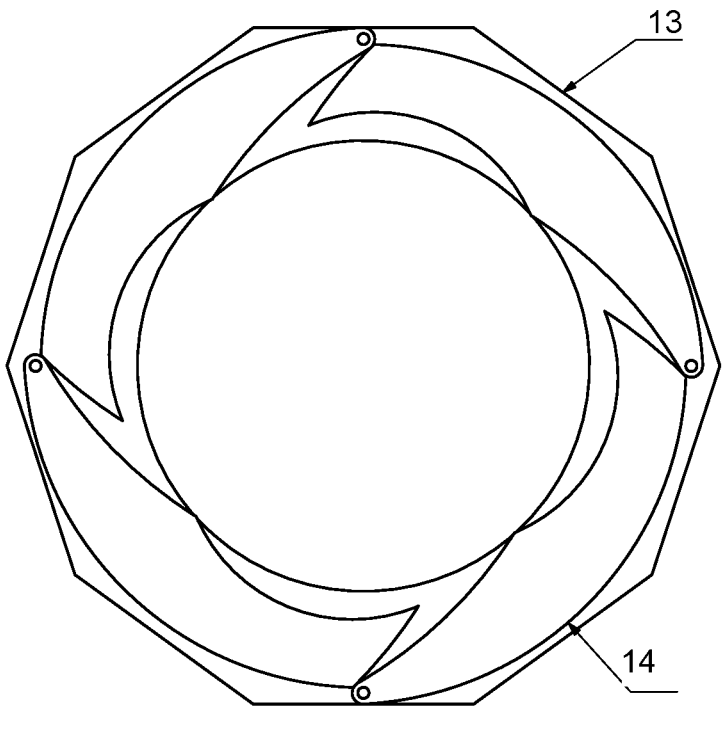
FIG. 9 shows a top view of a cover with an extendable portion comprising circularly extendable elements in a retracted position.
Figure 10:
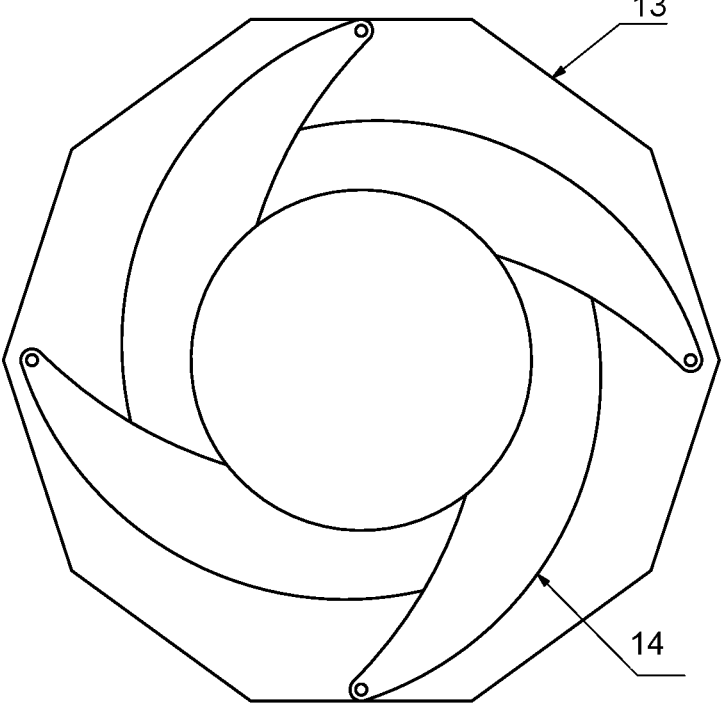
FIG. 10 shows a top view of a cover with an extendable portion comprising circularly extendable elements in an extended position.
Figure 11:
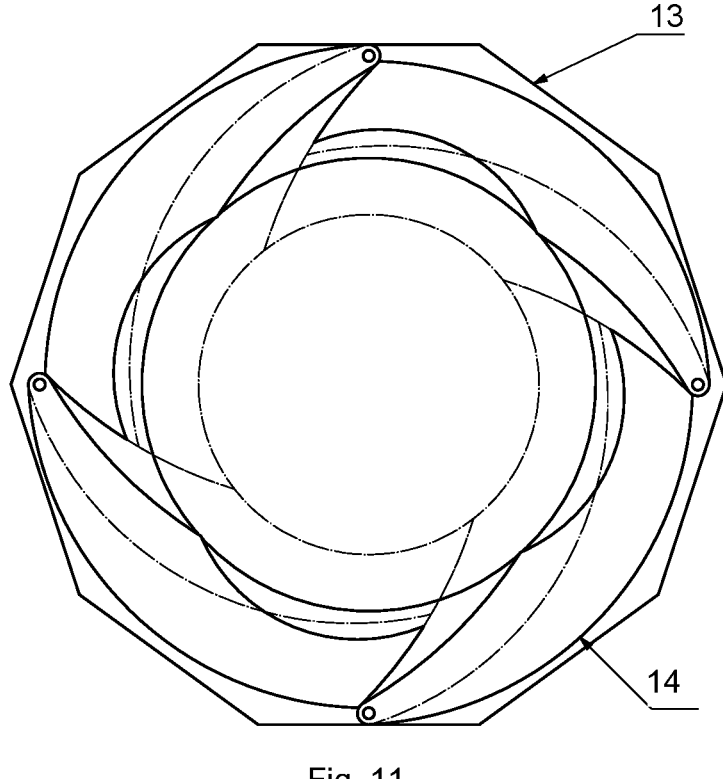
FIG. 11 shows a top view of a cover with an extendable portion comprising circularly extendable elements in a retracted (solid line) and an extended (dotted line) position.

Example 8: Second Embodiment of a Cover with Radially Extendable Elements Along a Circular Path FIGS. 9, 10 and 11 show a detail of a second embodiment of the cover 6 with elements analogous to those of FIGS. 6, 7 and 8, with the exception of the extendable portions 14 guided radially along a circular path. Analogous extendable elements 15 and an extension mechanism 16, which are not shown in FIGS. 9, 10 and 11, are also provided.

Example 9: Third Embodiment of a Cover with a Non-Rotatable Iris Diaphragm

Figure 12:
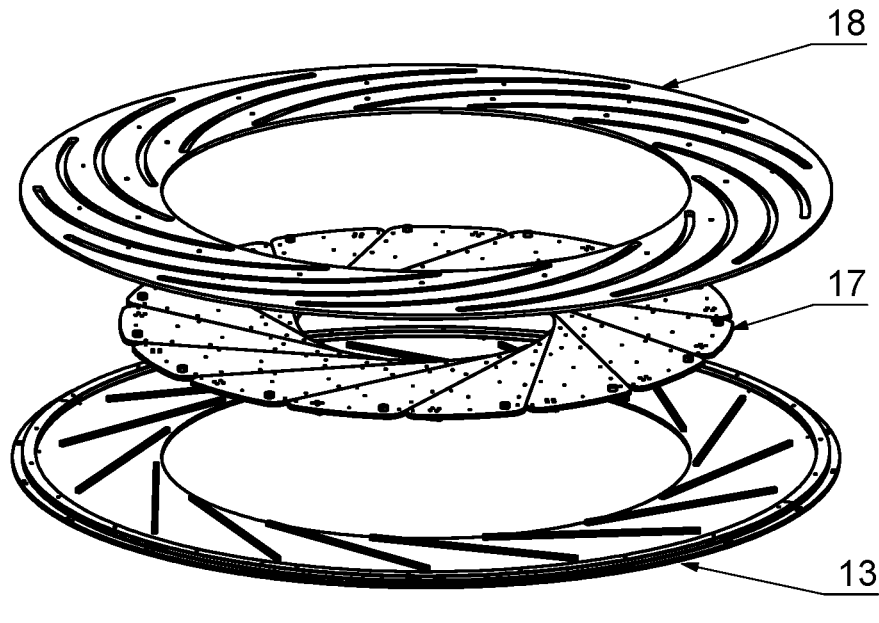
FIG. 12 shows a perspective view of a non-rotatable cover with an extendable portion in the form of an iris diaphragm comprising blades and a first rotatable ring.

FIG. 12 shows a third embodiment of the cover 6 with the stationary ring 13 on the outer circumference of said area, which is mounted in the lateral walls (or alternatively in the base or in the ceiling) of the heating chamber 5, and with the extendable portion 14 on the inner circumference of said area; i. e. in the form of an iris diaphragm. The extendable portion 14 comprises a first rotatable ring 18 which is rotatably attached to the stationary ring 13, and iris diaphragm blades 17 arranged in a circle and slidably mounted between the first rotatable ring 18 and the stationary ring 13. The blades 17 may be triangular in shape and made of stainless steel sheets.

Figures 13, 14:
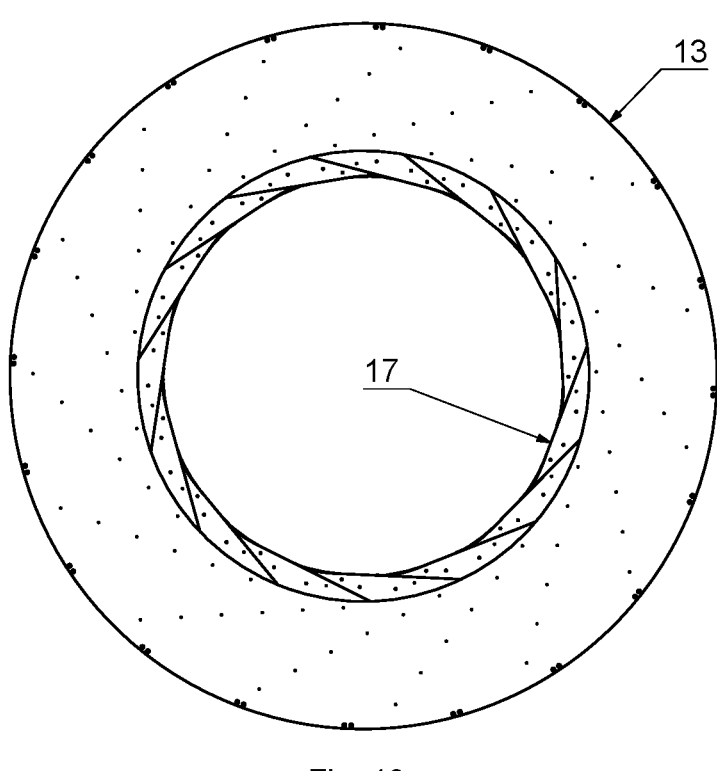
FIG. 13 shows a bottom view of a non-rotatable cover with an extendable portion in the form of an iris diaphragm comprising blades and a first rotatable ring in a retracted position.
FIG. 14 shows a bottom view of a non-rotatable cover with an extendable portion in the form of an iris diaphragm comprising blades and a first rotatable ring in an extended position.

The stationary ring 13 comprises on its surface a linear guide located substantially in a tangential direction and the first rotatable ring 18 comprises on its surface arcuate grooves spirally guided from its edge in a radial direction. The blades 17 comprise parts which guide the blade along the linear guide of the stationary ring 13 and sheaves which fit into the spirally guided arcuate grooves of the first rotatable ring 18. When the first rotatable ring 18 is rotated relative to the stationary ring 13, the sheaves move between the individual ends of the two grooves, causing the blades to move along the linear guide and the iris diaphragm to open and close between the retracted (FIG. 13) and extended position (FIG. 14). According to another embodiment, the linear guides are on the first rotatable ring 18 and the spirally guided arcuate grooves are on the stationary ring 13 (not shown).

Figures 15, 16:
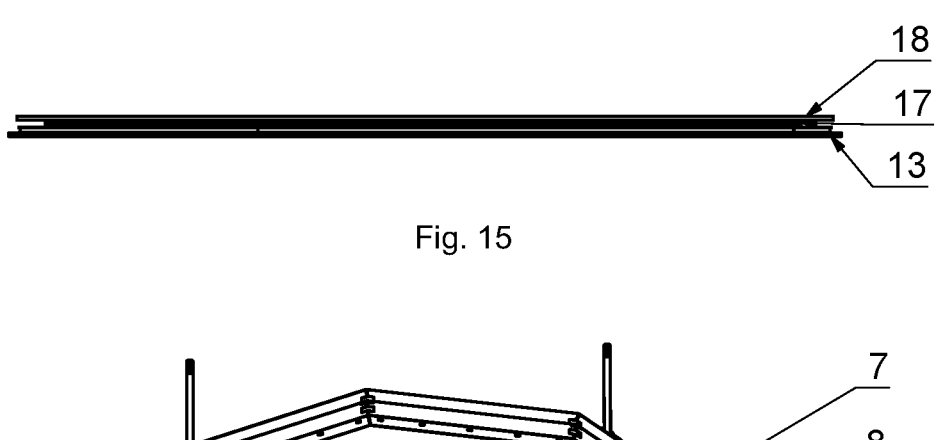
FIG. 15 shows a side view of a non-rotatable cover with an extendable portion in the form of an iris diaphragm comprising blades and a first rotatable ring.
FIG. 16 shows a perspective view of a rotatable cover with an extendable portion in the form of an iris diaphragm and with a lifting mechanism, and of a supporting element in the shape of an inverted truncated cone.

FIG. 15 shows a third embodiment of the cover 6 in a side view, which shows an arrangement of the blades 17 between the stationary ring 13 and the first rotatable ring 18. The stationary ring 13 may be at the bottom and the first rotatable ring 18 at the top of the cover 6 (as shown in FIG. 15) or alternatively, the stationary ring 13 may be at the top and the first rotatable ring 18 at the bottom of the cover 6 (not shown). In this embodiment, the extendable part 14 in the form of an iris diaphragm is not rotatable relative to the rotated rotatable article 10.

Example 10: A Fourth Embodiment of a Cover with a Rotatable Iris Diaphragm

FIG. 16 shows a fourth embodiment of the covers 6, i. e. the lower and upper cover 6. The supporting element 8 is in this case in the shape of an inverted truncated cone (e. g. a bowl) and the strutting element 7 is analogous to that described in FIG. 2. Both covers 6 are vertically slidable within the heating chamber 5 by a lifting mechanism 27, which secures the vertical position of the covers 6 by means of moving screws. Thus, the covers 6 are not mounted in the lateral walls of the heating chamber 5 but are vertically slidable relative to the lateral walls of the heating chamber 5. The lifting mechanism 27 can be combined with any other embodiment of the invention, especially with the embodiments described in Examples 1 to 9 and 11, thereby allowing at least one cover 6, and preferably two covers 6, being slidable vertically relative to the lateral wall of the heating chamber 5 in these examples.

Figure 17:
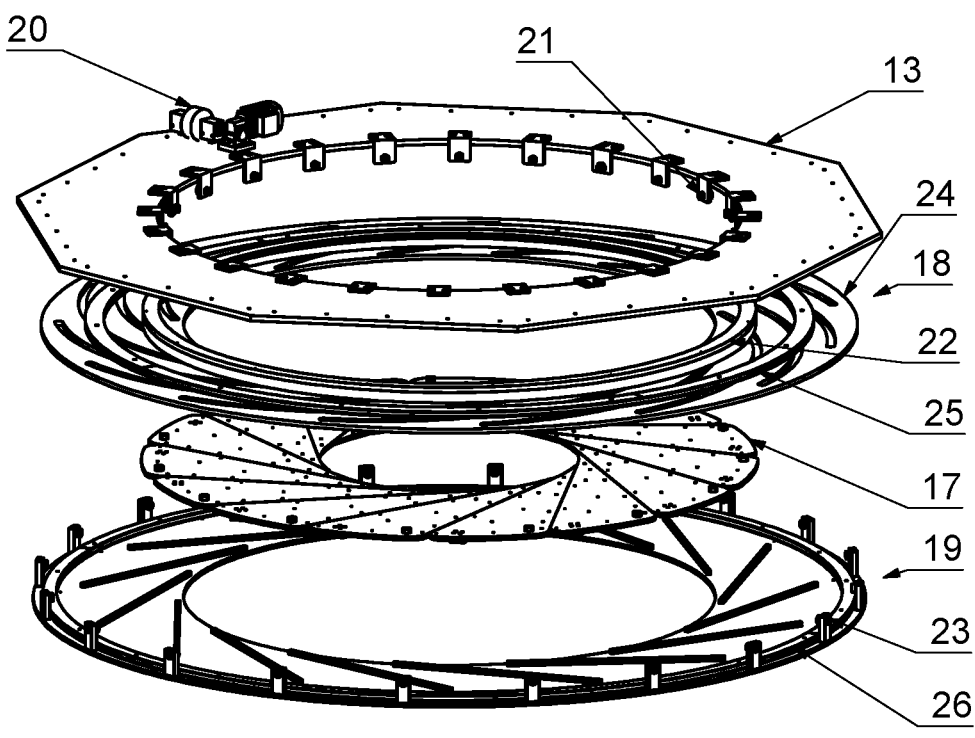
FIG. 17 shows a perspective view of a rotatable cover with an extendable portion in the form of an iris diaphragm comprising blades, a first rotatable ring and a second rotatable ring.

FIG. 17 shows a fourth embodiment of the cover 6 with the stationary ring 13 on the outer circumference of said area, which is mounted in the lateral walls (or alternatively in the base or in the ceiling) of the heating chamber 5, and with the extendable portion 14 on the inner circumference of said area, i. e. in the form of an iris diaphragm. The extendable portion 14 comprises a first rotatable ring 18 that is rotatably attached to the stationary ring 13, a second rotatable ring 19 that is rotatably attached to the stationary ring 13 and the first rotatable ring 18, and iris diaphragm blades 17 arranged in a circle and slidably mounted between the first rotatable ring 18 and the second rotatable ring 19. The blades 17 can be triangular in shape and made of stainless steel sheets.

The rotational connection of the stationary ring 13 to the first rotatable ring 18 is provided by a first sheave assembly 21 on the inner circumference of the stationary ring 13 and a first guide 22 mounted on the first rotatable ring 18, in particular near the inner circumference of the first rotatable ring 18. The rotational connection of the first rotatable ring 18 to the second rotatable ring 19 is provided by a second sheave assembly 23 on the outer circumference of the second rotatable ring 19 and a second guide 24 mounted on the first rotatable ring 18, substantially formed by the very edge of the first rotatable ring 18.

Arranged on the stationary ring 13, there is a ring rotation drive 20 which is connected by a first rotatable drive toothing 25 on the first rotatable ring 18, in particular near the outer circumference of the first rotatable ring 18, and which is further connected to a second rotatable drive toothing 26 on the second rotatable ring 19, in particular near the outer circumference of the second rotatable ring 19. The ring rotation drive 20 may, for example, be formed by a motor with a pair of bevel gearboxes transmitting the rotational motion to the first and second toothing 25, 26 of the rotation drive, which allows the rotation drive of the second rotatable ring 19 to be selectively disengaged. It is thus also possible to rotate both rings and the blades simultaneously with the heated rotatable article 10.

Figure 18:
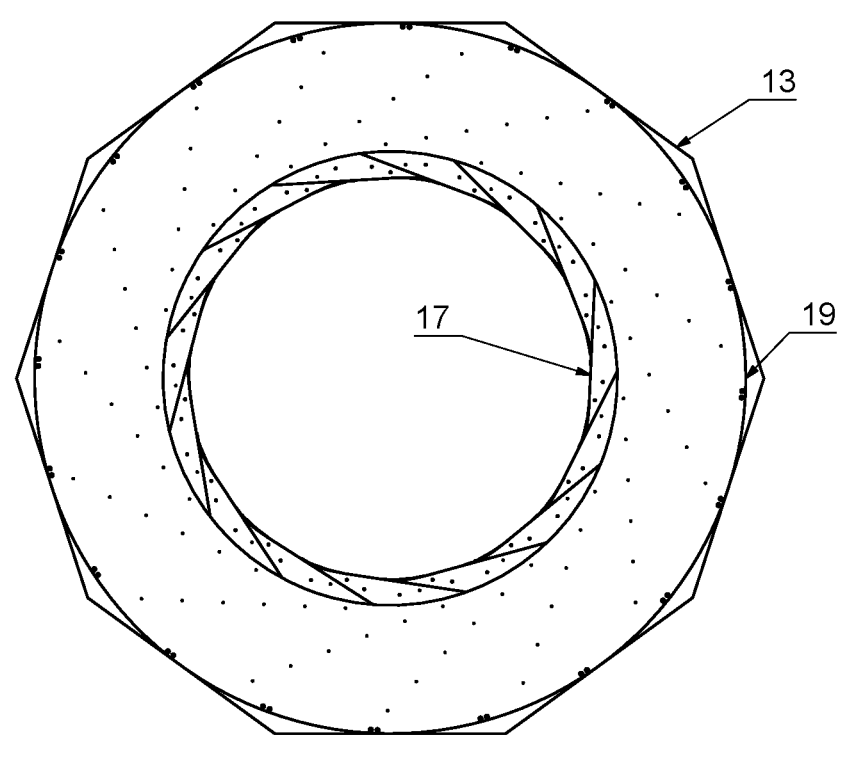
FIG. 18 shows a bottom view of a rotatable cover with an extendable portion in the form of an iris diaphragm comprising blades, a first rotatable ring and a second rotatable ring in a retracted position.
Figure 19:
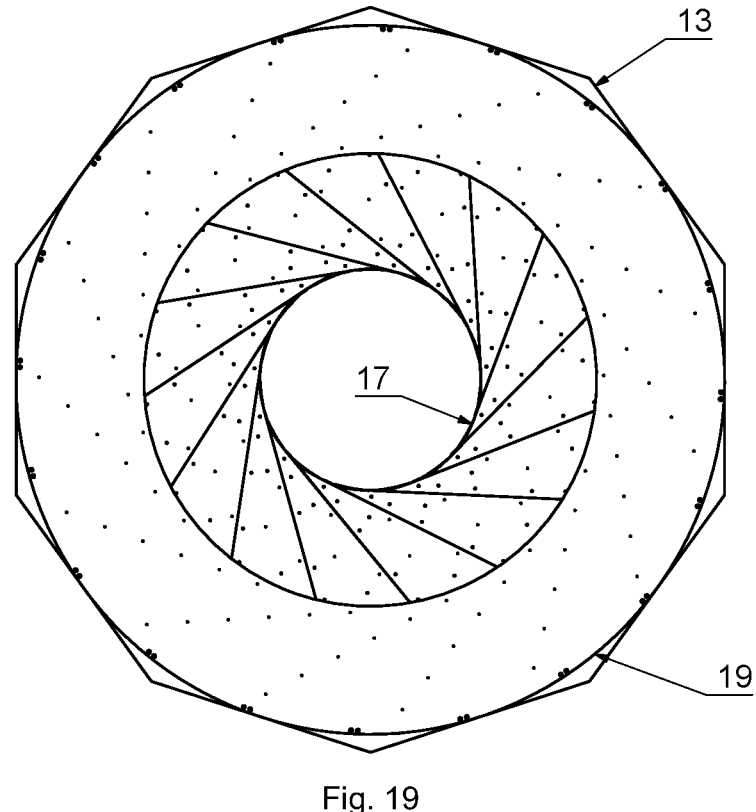
FIG. 19 shows a bottom view of a rotatable cover with an extendable portion in the form of an iris diaphragm comprising blades, a first rotatable ring and a second rotatable ring in an extended position.

The second rotatable ring 19 further comprises on its surface a linear guide located substantially in a tangential direction and the first rotatable ring 18 comprises on its surface arcuate grooves spirally guided from its edge in a radial direction. The blades 17 comprise parts which guide the blade along the linear guide of the second rotatable ring 19 and sheaves which fit into the spirally guided arcuate grooves of the first rotatable ring 18. The sheaves slide between the individual ends of the two grooves when the first rotatable ring 18 rotates relative to the second rotatable ring 19, which causes the movement of the blades along the linear guide and the opening and closing of the iris diaphragm between the retracted (FIG. 18) and the extended position (FIG. 19). According to another embodiment, the linear guides are on the first rotatable ring 18 and the spirally guided arcuate grooves are on the second rotatable ring 19 (not shown).

Figure 20:
FIG. 20 shows a side view of a rotatable cover with an extendable portion in the form of an iris diaphragm comprising blades, a first rotatable ring, a second rotatable ring and a ring rotation drive.

FIG. 20 is a side view of a fourth embodiment of the cover 6, showing an arrangement of the blades 17 between the first rotatable ring 18 and the second rotatable ring 19 and the arrangement of the first rotatable ring 18 between the blades 17 and the stationary ring 13. The stationary ring 13 may be at the top and the second rotatable ring 19 at the bottom of the cover 6 (as shown in FIG. 20) or the stationary ring 13 may be at the bottom and the second rotatable ring 19 at the top of the cover 6 (not shown).

Thus, in this embodiment, the extendable portion 14 in the form of an iris diaphragm is rotatable together with the rotated rotatable article 10.

Example 11: A Method of Microwave Heating of a Green Tyre Blank

In the apparatus according to the previous examples, direct and selective heating of the tread 3 of the green tyre blank 10 can be performed prior to vulcanisation in the heating space defined by at least one inlet of the wave guide 11 in the lateral wall of the heating chamber 5, the heated portion (the tread 3) and at least two covers 6 arranged one above another and in the form of said area, mounted in the lateral walls (or alternatively in the base or in the ceiling) of the heating chamber 5. At least one cover 6 in the heating chamber 5 comprises the stationary ring 13 on the outer circumference of said area and at least one extendable portion 14 on the inner circumference of said area, wherein the non-heated portions (the sidewalls 4 and the beads 1) outside the heating space are not directly heated.

Figure 28:
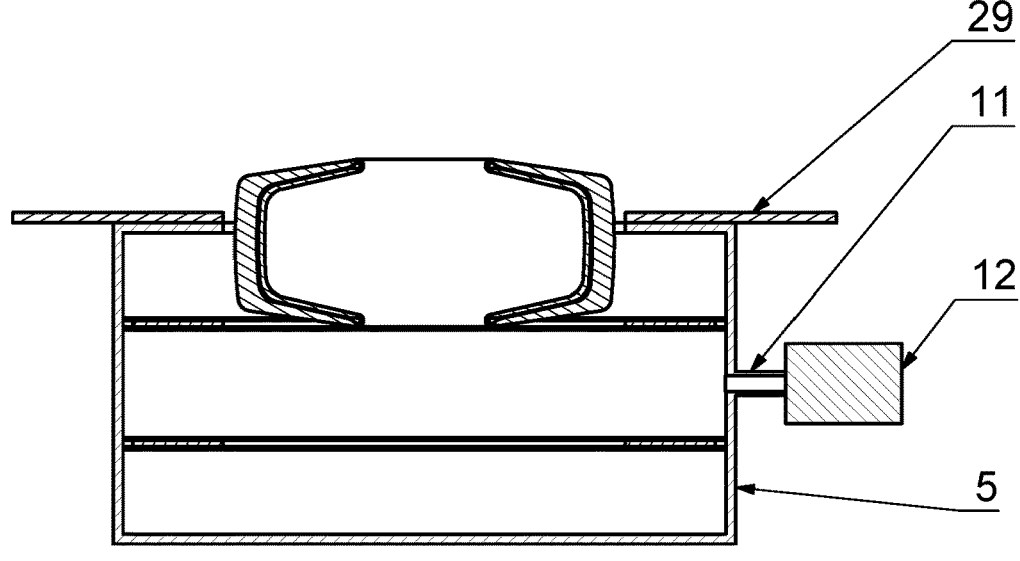
FIG. 28 shows a schematic cross-sectional view of a heating chamber with a door in the ceiling.
Figure 29:
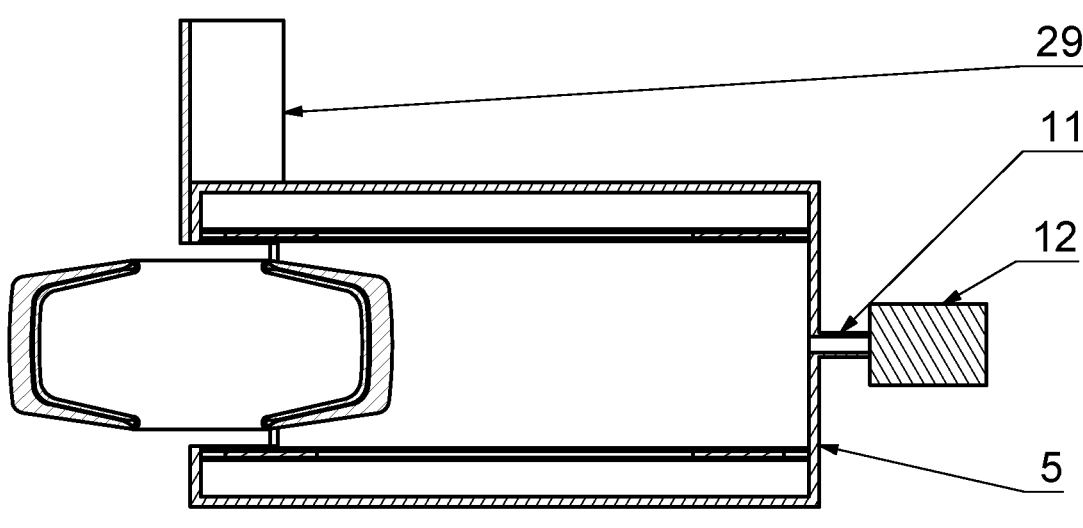
FIG. 29 shows a schematic cross-sectional view of a heating chamber with a door in the lateral wall.

First, the tyre 10 is inserted into the heating chamber with the extendable portion 14 of at least one cover 6 in the retracted position, see FIG. 28 with a door 29 located in the ceiling of the heating chamber. Subsequently, the extendable portion 14 moves to the extended position, and the heating space is created for heating only the specific portions of the tyre in particular the tread 3. After heating, the extendable portion 14 of the cover is moved to the retracted position and the pre-heated tyre 10 is removed from the heating chamber 5, and it is inserted e. g. into a vulcanisation press.

Alternatively, the tyre 10 can be inserted into the heating chamber through a door 29 in the lateral wall of the heating chamber 5. Such an arrangement is also suitable for operator and maintenance access, e. g. when measuring the temperature of the rotatable article 10 while interrupting the process. Even in the case of height-adjustable covers 6 which are vertically slidable relative to the lateral walls of the heating chamber 5, a rotatable article 10 to be heated can be inserted through this opening, the covers 6 being placed onto the opening after insertion.

In both cases of inserting the rotatable article, the supporting element 8, or a part thereof, can represent an external entity and be placed in the chamber together with the heated article 10, i. e. the rotatable article 10 is, for example, clamped in the supporting element 8 outside the heating chamber 5, and the whole is inserted inside.

To achieve an inhomogeneous field to compensate for the non-uniform heating of the green tyre blank 10 due to the inhomogeneity of the shape and/or material of the tyre, selective zone heating by microwave radiation is performed by controlling the power of a plurality of microwave radiation sources 12, i. e. only to those heating spaces requiring a higher dose of radiation.

Conversely, in order to create a homogeneous field, and thus ensure uniform heating of the rotatable article 10 without rotation, microwave heating is performed by means of one microwave radiation source 12 (or sources) and such an architecture of the wave guide or wave guides 11, which allows uniform heating, such as by means of a circumferential slotted wave guide 11. For uniform heating, it is advantageous if the inlets of the wave guide 11 are spaced apart at regular distances around the entire circumference. The inlets can be placed in one or more planes, for example by placing two slotted wave guides on top of each other in order to create zones of selective heating along the height of the heated article.

INDUSTRIAL APPLICABILITY

The above-described apparatus for and method of microwave heating of rotatable articles can be used for pre-heating of green tyre blanks before a vulcanisation step in order to increase the productivity of vulcanisation presses.

LIST OF REFERENCE SIGNS

1 bead
2 steel belt
3 heated portion; tread
4 non-heated portion; sidewall
5 heating chamber
6 cover
7 strutting element
8 supporting element
9 rotation drive

10 rotatable article; green tyre blank
11 wave guide
12 microwave radiation source
13 stationary ring
14 extendable portion
15 extendable element
16 extension mechanism
17 iris diaphragm blade
18 first rotatable ring
19 second rotatable ring
20 ring rotation drive
21 first sheave assembly
22 first guide
23 second sheave assembly
24 second guide
25 first rotatable drive toothing
26 second rotatable drive toothing
27 lifting mechanism
28 suspension element
29 door to the heating chamber 5

The invention claimed is:

1. A method of microwave heating of rotatable articles by at least one microwave radiation source (12) in a heating chamber (5) configured to receive a rotatable article, wherein each microwave radiation source (12) is connected to the heating chamber (5) via at least one wave guide (11) having at least one inlet in a lateral wall of the heating chamber (5), wherein the rotatable article comprises a material absorbing microwave radiation, wherein direct and selective heating of a heated portion (3) of the rotatable article is performed in a heating space defined by at least one inlet of the wave guide (11) in the lateral wall of the heating chamber (5), the heated portion (3) of the rotatable article and at least two covers (6) arranged one above another and in the form of an area defined by an inner and outer circumference, wherein at least one cover (6) is attached in the heating chamber (5) and/or at least one cover (6) is vertically slidable relative to the lateral wall of the heating chamber (5) such that the covers (6) prevent microwave radiation to propagate outside the heating space in the vertical direction, wherein at least one cover (6) comprises a stationary ring (13) on the outer circumference of said area, wherein the non-heated portions (4) of the rotatable article outside the heating space are not directly heated, wherein at least one cover (6) comprises at least one extendable portion (14) on the inner circumference of said area.

2. The method according to claim 1, characterised in that the rotatable article is a green tyre blank prior to vulcanisation, wherein the heated portion (3) is a tyre tread, and the non-heated portions (4) are tyre sidewalls.

3. The method according to claim 1, characterised in that the heating of the heated portion (3) of the rotatable article is performed by at least two microwave radiation sources (12), wherein the inlets of the wave guides (11) of the microwave radiation sources (12) in the lateral wall of the heating chamber (5) are arranged at a distance from each other and in the same and/or different horizontal plane, wherein an inhomogeneous microwave radiation field is creatable in the heating space by regulating the power of the microwave radiation sources (12).

4. The method according to claim 1, characterised in that during the heating, the lower non-heated portion (4) of the rotatable article in the heating chamber (5) is supported by a supporting element (8) or suspended on a suspension element (28) and the upper non-heated portion (4) of the rotatable article in the heating chamber (5) is supported by a strutting element (7) or is suspended on the suspension element (28).

5. The method according to claim 4, characterised in that during the heating, the rotatable article is rotated relative to the heating chamber (5) such that the upper and lower non-heated portions (4) of the rotatable article are rotatable in the same direction and substantially at the same angular velocity.

6. A method of microwave heating of rotatable articles by at least one microwave radiation source (12) in a heating chamber (5) configured to receive a rotatable article, wherein each microwave radiation source (12) is connected to the heating chamber (5) via at least one wave guide (11) having at least one inlet in a lateral wall of the heating chamber (5), wherein the rotatable article comprises a material absorbing microwave radiation, wherein direct and selective heating of a heated portion (3) of the rotatable article is performed in a heating space defined by at least one inlet of the wave guide (11) in the lateral wall of the heating chamber (5), the heated portion (3) of the rotatable article and at least two covers (6) arranged one above another and in the form of an area defined by an inner and outer circumference, wherein at least one cover (6) is vertically slidable relative to the lateral wall of the heating chamber (5) such that the covers (6) prevent microwave radiation to propagate outside the heating space in the vertical direction, wherein the non-heated portions (4) of the rotatable article outside the heating space are not directly heated, wherein at least one cover (6) is vertically slidable relative to the lateral wall of the heating chamber (5) by a lifting mechanism (27).

7. The method according to claim 6, characterised in that the rotatable article is a green tyre blank prior to vulcanisation, wherein the heated portion (3) is a tyre tread, and the non-heated portions (4) are tyre sidewalls.

8. The method according to claim 6, characterised in that the heating of the heated portion (3) of the rotatable article is performed by at least two microwave radiation sources (12), wherein the inlets of the wave guides (11) of the microwave radiation sources (12) in the lateral wall of the heating chamber (5) are arranged at a distance from each other and in the same and/or different horizontal plane, wherein an inhomogeneous microwave radiation field is creatable in the heating space by regulating the power of the microwave radiation sources (12).

9. An apparatus for microwave heating of rotatable articles, comprising at least one microwave radiation source (12), at least one wave guide (11) and a heating chamber (5) for receiving a rotatable article, wherein the rotatable article comprises a material absorbing microwave radiation, wherein each microwave radiation source (12) is connected to the heating chamber (5) via at least one wave guide (11) having at least one inlet in a lateral wall of the heating chamber (5), wherein the heating chamber (5) comprises at least two covers (6) arranged one above another and in the form of an area defined by an inner and outer circumference, wherein the covers (6) comprise an opening in the middle, wherein the covers (6) are configured to define a heating space between at least one inlet of the wave guide (11) in the lateral wall of the heating chamber (5) and the heated portion (3) of the rotatable article, and are further configured to prevent microwave radiation from propagating outside the heating space in the vertical direction, wherein at least one cover (6) is attached in the heating chamber (5) and/or at least one cover (6) is vertically slidable relative to the lateral wall of the heating chamber (5), wherein at least one cover (6) comprises a stationary ring (13) on the outer circumference of said area, wherein at least one cover (6) comprises at least one extendable portion (14) on the inner circumference of said area.

10. The apparatus according to claim 9, characterised in that the extendable portion (14) of the cover (6) comprises extendable elements (15) which are connected to the stationary ring (13) by an extension mechanism (16).

11. The apparatus according to claim 9, characterised in that the extendable portion (14) of the cover (6) is in the form of an iris diaphragm and comprises a first rotatable ring (18) rotatably mounted to the stationary ring (13) and at least two blades (17) arranged in a circle and slidably mounted between the first rotatable ring (18) and the stationary ring (13) or the cover (6) is in the form of the iris diaphragm and comprises the first rotatable ring (18) rotatably mounted to the stationary ring (13), a second rotatable ring (19) rotatably mounted to the stationary ring (13) and to the first rotatable ring (18), and blades (17) arranged in a circle and slidably mounted between the first rotatable ring (18) and the second rotatable ring (19).

12. The apparatus according to claim 9, characterised in that the heating chamber (5) comprises a supporting element (8) for supporting the lower, non-heated portion (4) of the rotatable article.

13. The apparatus according to claim 12, characterised in that the supporting element (8) is in the shape of an inverted truncated cone.

14. The apparatus according to claim 12, characterised in that the supporting element (8) is an integral part of the lower cover (6).

15. The apparatus according to claim 12, characterised in that any of the group of the supporting element (8), the strutting element (7) and the suspension element (28) is rotatable and mechanically connectable to the rotation drive (9) such that the upper and lower non-heated portions (4) of the rotatable article are rotatable with respect to the heating chamber in the same direction and substantially at the same angular velocity.

16. The apparatus according to claim 9, characterised in that the heating chamber (5) comprises a strutting element (7) for strutting the upper, non-heated portion (4) of the rotatable article.

17. The apparatus according to claim 9, characterised in that the heating chamber (5) comprises a suspension element (28) for hanging the lower non-heated portion (4) or the upper non-heated portion (4) of the rotatable article.

18. The apparatus according to claim 9, characterised in that the wave guide (11) is arranged around the entire circumference or at least a part of the circumference of the lateral wall of the heating chamber (5) and comprises at least one inlet in the lateral wall of the heating chamber (5) or at a distance from another inlet in the lateral wall of the heating chamber (5) and in the same and/or different horizontal plane.

19. The apparatus according to claim 9, characterised in that the rotatable article is a green tyre blank prior to vulcanisation, wherein the heated portion (3) is a tyre tread, and the non-heated portions (4) are tyre sidewalls.

20. An apparatus for microwave heating of rotatable articles, comprising at least one microwave radiation source (12), at least one wave guide (11) and a heating chamber (5) for receiving a rotatable article, wherein the rotatable article comprises a material absorbing microwave radiation, wherein each microwave radiation source (12) is connected to the heating chamber (5) via at least one wave guide (11) having at least one inlet in a lateral wall of the heating chamber (5), wherein the heating chamber (5) comprises at least two covers (6) arranged one above another and in the form of an area defined by an inner and outer circumference, wherein the covers (6) comprise an opening in the middle, wherein the covers (6) are configured to define a heating space between at least one inlet of the wave guide (11) in the lateral wall of the heating chamber (5) and the heated portion (3) of the rotatable article, and are further configured to prevent microwave radiation from propagating outside the heating space in the vertical direction, wherein at least one cover (6) is vertically slidable relative to the lateral wall of the heating chamber (5) by a lifting mechanism (27).

\*  \*  \*  \*  \*